US009277399B2

(12) United States Patent
Cherian et al.

(10) Patent No.: US 9,277,399 B2
(45) Date of Patent: Mar. 1, 2016

(54) SYSTEMS AND METHODS FOR REDUCED LATENCY WHEN ESTABLISHING COMMUNICATION WITH A WIRELESS COMMUNICATION SYSTEM

(71) Applicant: QUALCOMM Incorporated, San Diego, CA (US)

(72) Inventors: George Cherian, San Diego, CA (US); Jouni Kalevi Malinen, Tuusula (FI); Santosh Paul Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/184,660

(22) Filed: Feb. 19, 2014

(65) Prior Publication Data
US 2014/0241267 A1 Aug. 28, 2014

Related U.S. Application Data

(60) Provisional application No. 61/768,059, filed on Feb. 22, 2013.

(51) Int. Cl.
*H04W 8/00* (2009.01)
*H04W 8/26* (2009.01)
(Continued)

(52) U.S. Cl.
CPC ............... *H04W 8/26* (2013.01); *H04L 61/103* (2013.01); *H04L 61/1511* (2013.01); *H04L 61/2015* (2013.01); *H04W 8/005* (2013.01); *H04W 60/00* (2013.01)

(58) Field of Classification Search
CPC ... H04L 45/54; H04L 63/062; H04L 63/0823; H04L 63/0428; H04L 63/065; H04L 63/08; H04L 63/0884; H04L 63/162; H04L 61/103; H04L 61/1511; H04L 61/2015; H04W 12/06; H04W 40/20; H04W 40/26; H04W 84/12; H04W 84/18; H04W 40/248; H04W 8/005; H04W 8/26; H04W 60/00
USPC ........................... 370/254–350; 709/201–213
See application file for complete search history.

(56) References Cited

U.S. PATENT DOCUMENTS 7,596,376 B2 * 9/2009 Calhoun et al. ............... 455/436
8,233,424 B2 * 7/2012 Tamura ......................... 370/315
(Continued)

FOREIGN PATENT DOCUMENTS

WO WO-03037009 A1 5/2003
WO WO-2010044533 A1 4/2010
(Continued)

OTHER PUBLICATIONS

Feng C.Y., et al., "Fast Security Setup, 11-11-1426-00-00aifast-security-setup", IEEE Draft, 11-11-1426-00-00AI-Fast-Security-Setup, IEEE-SA Mentor, Piscataway, NJ USA, vol. 802.11ai, Nov. 4, 2011, pp. 1-13, XP017673327, [retrieved on Nov. 4, 2011].
(Continued)

*Primary Examiner* — Ayaz Sheikh
*Assistant Examiner* — Debebe Asefa
(74) *Attorney, Agent, or Firm* — Knobbe Martens Olson & Bear LLP

(57) ABSTRACT

Systems and methods reduce latency associated with establishing communication on a wireless network. In one aspect, an access point determines interface identifiers for associated stations. Because the access point can ensure interface identifiers are not duplicated across associated stations, the need for duplicate address detection by the stations is reduced. In another aspect, an access point provides domain name system server network address information to a station. By providing the network address information of the DNS server, the need for the station to perform separate signaling to obtain the information is reduced. In another aspect, an access point transmits a mapping of a first station's network address to the first station's medium access control address to one or more associated stations. This may reduce the need for an associated station to perform address resolution signaling when attempting to communicate with the first station.

39 Claims, 19 Drawing Sheets

(51) Int. Cl.
  *H04W 60/00* (2009.01)
  *H04L 29/12* (2006.01)

(56) References Cited

U.S. PATENT DOCUMENTS

| | | | |
|---|---|---|---|
| 8,428,036 B2* | 4/2013 | Herscovici et al. | 370/338 |
| 8,688,041 B2* | 4/2014 | Ji et al. | 455/41.2 |
| 2004/0190477 A1 | 9/2004 | Olson et al. | |
| 2005/0018677 A1 | 1/2005 | Lee et al. | |
| 2005/0135422 A1 | 6/2005 | Yeh | |
| 2007/0286209 A1 | 12/2007 | Wang et al. | |
| 2008/0043665 A1 | 2/2008 | Jeon et al. | |
| 2009/0052347 A1 | 2/2009 | Kim | |
| 2011/0087991 A1 | 4/2011 | Levison et al. | |
| 2013/0114463 A1 | 5/2013 | Li | |
| 2013/0247150 A1 | 9/2013 | Cherian et al. | |
| 2014/0022936 A1 | 1/2014 | Robitaille et al. | |
| 2014/0241266 A1 | 8/2014 | Cherian et al. | |

FOREIGN PATENT DOCUMENTS

| | | |
|---|---|---|
| WO | WO-2012035198 A1 | 3/2012 |
| WO | WO-2013040039 A1 | 3/2013 |

OTHER PUBLICATIONS

Feng C.Y., et al.,"Text for Fast Security Setup, 11-12-0015-00-00ai-text-for-fast-security-setup", IEEE SA Mentor, 11-12-0015-00-00AI-Text-For-Fast-Securitysetup, IEEE-SA Mentor, Piscataway, NJ USA, vol. 802.11ai, Jan. 12, 2012, pp. 1-7, XP068038052, [retrieved on Jan. 12, 2012].

International Search Report and Written Opinion—PCT/US2014/017368—ISA/EPO—Jun. 13, 2014.

Morioka H., et al., "IP Address assignment: Offline discussion summary," doc.: IEEE 802.11-13/0346r0, Mar. 2013, 3 Slides.

Tseng C.C., et al., "Proactive DAD: An L2-assisted Fast Address Acquisition Strategy for Mobile IPv6 Networks," 2006, 12 pages.

* cited by examiner

SYSTEMS AND METHODS FOR REDUCED LATENCY WHEN ESTABLISHING COMMUNICATION WITH A WIRELESS COMMUNICATION SYSTEM

RELATED APPLICATIONS

This application claims the benefit of priority to U.S. Provisional Patent Application No. 61/768,059 entitled "SYSTEMS AND METHODS FOR REDUCED LATENCY WHEN ESTABLISHING COMMUNICATION WITH A WIRELESS COMMUNICATION SYSTEM," filed Feb. 22, 2013, the disclosure of which is hereby incorporated herein by reference in its entirety.

BACKGROUND

1. Field

The present application relates generally to wireless communication systems and more specifically to systems, methods, and devices for reduced connection latency with a wireless communication systems.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol (IP) suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

Before a device can communicate via a given network, the device may be required to identify and connect with an access point in order to gain access to the network. The device may discover an access point via various transmissions of wireless signals, e.g., a beacon signal from an access point indicating the presence and availability of services. A device may further seek services following the receipt of a broadcast message requesting services. An access point in receipt of the broadcast message or an association request following a beacon may then respond to the device, in some cases providing a requested network address or other information requested by the device. The device may request information regarding other devices or access points in the network such as network addresses (e.g., IP addresses or Medium access control (MAC) addresses). As multiple devices enter or leave a given service area associated with an access point, communications traffic increases, increasing the rate of data collisions, overhead, and latency, while decreasing overall efficiency.

In current implementations, many wireless communications systems employ a serial communications scheme in which, for example, a device requesting association with an access point may sequentially transmit a series of communications to the access point, first requesting association, and later requesting further information, at which point the access point may respond sequentially to such communications. Following transmission of an association response to the device in response, the access point may for example then request additional information from the network to provide to the device; however the access point does not request such information from the network (e.g., network addresses and MAC addresses of other devices or a DHCP server) until such a request is made by the device. Such a sequential or serial communications scheme may add to the latency of the communications between a device and the access point.

Therefore it would be advantageous to provide a system and method to increase the efficiency and reduce latency in wireless communication by performing some processes in parallel.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one would appreciate how the features of this invention provide advantages that include fast initial network link setup wireless communication systems for access points and devices.

In one innovative aspect of the disclosure, a system, method, and apparatus for reducing latency in wireless communication is disclosed. The method comprises transmitting, by a first station, an association request to an access point. The method further comprises receiving, by the first station, an association response from the access point, the association response indicating at least a portion of an assigned network address having been assigned by the access point, or at least one network address of at least one domain name system server. A system and apparatus for implementing the method are disclosed, in addition to a computer readable storage medium configured to store code that when executed, completes the steps of the disclosed method.

In another aspect, a system, method, and apparatus for reducing latency in wireless communication is disclosed. The method comprises, receiving, at an access point, an authentication request frame from a first station. The method further comprises transmitting, in response to the authentication request frame, a request for a network address assignment to a network address assignment server for at least the first station, or a request for a network address of a domain name system server. The method further comprises receiving, at least a portion of an assigned network address or the network address the one domain name system server. The method further comprises receiving, after transmitting the request for network address assignment, an association request from the first station, and transmitting an association response to the first station, the association response comprising the at least a portion of an assigned network address, or the network address of the domain name system server.

DETAILED DESCRIPTION

Figure 1:
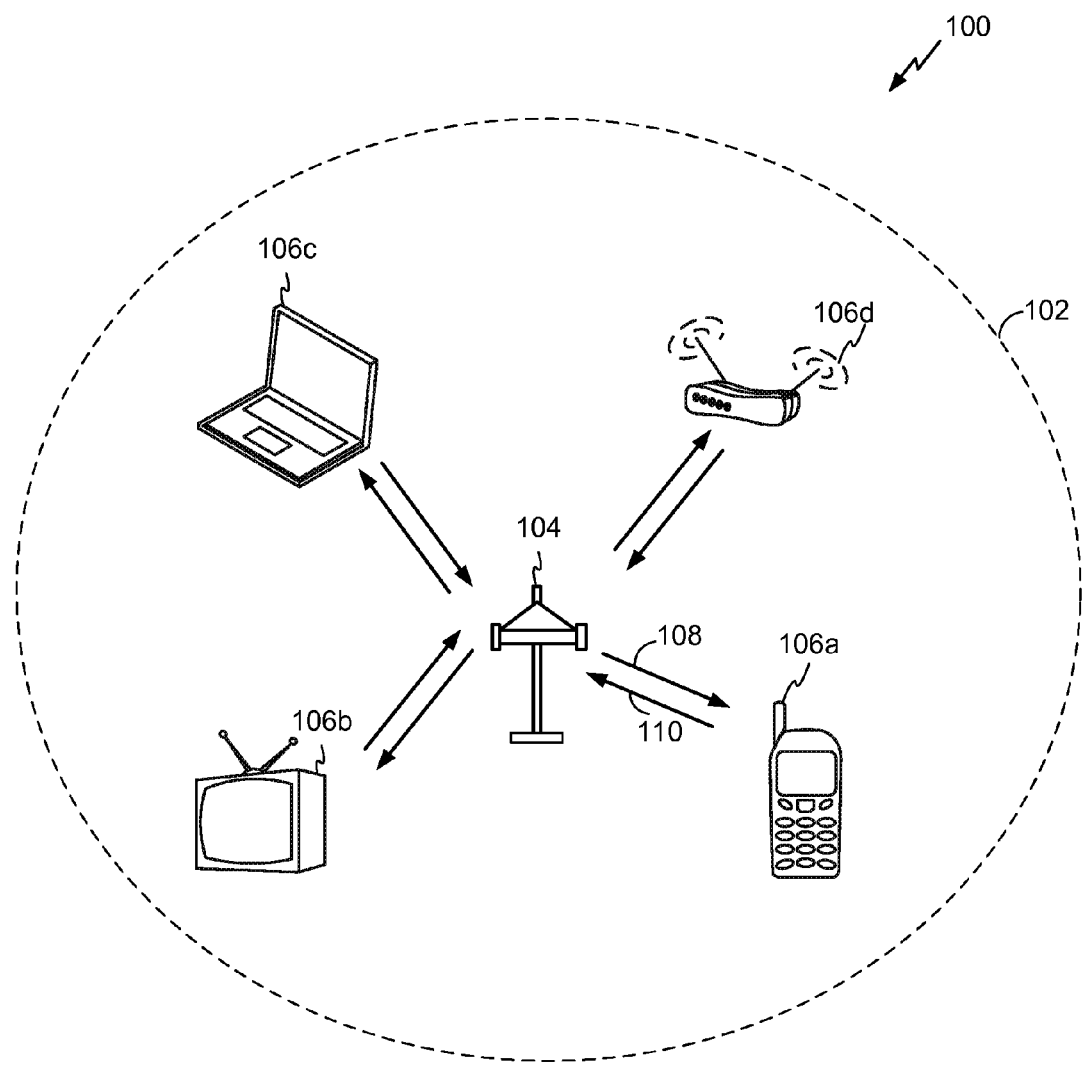
FIG. 1 shows an exemplary wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as wireless protocols. For example, the various aspects described herein may be used as part of the IEEE 802.11ah protocol, which uses sub-1 GHz bands. While the terminology may be used in describing 802.11 systems, the disclosure is not limited to 802.11 wireless technologies. The systems and methods described herein may be applied for DNS (Domain Name System) querying in LTE (Long Term Evolution), UMTS (Universal Mobile Telecommunications System), HRPD (High Rate Packet Data), or CDMA (Code Division Multiple Access) (e.g., CDMA 1x) based networks.

In some aspects, wireless signals in a sub-gigahertz band may be transmitted, for example, according to the 802.11ah protocol. Transmission may use orthogonal frequency-division multiplexing (OFDM), direct—sequence spread spectrum (DSSS) communications, a combination of OFDM and DSSS communications, or other schemes. Implementations of the 802.11ah protocol or other sub-gigahertz protocols may be used for sensors, metering, and smart grid networks. Aspects of certain devices implementing such protocols may consume less power than devices implementing other wireless protocols. These devices may be used to transmit wireless signals across a relatively long range, for example about one kilometer or longer.

In some implementations, a WLAN includes various devices which are the components that access the wireless network. For example, there may be two types of devices: access points (APs) and clients (also referred to as stations, or STAs). In general, an AP serves as a hub or base station for the WLAN and a STA serves as a user of the WLAN. For example, a STA may be a laptop computer, a personal digital assistant (PDA), a mobile phone, etc. In an example, a STA connects to an AP via a WiFi (e.g., IEEE 802.11 protocol such as 802.11ah) compliant wireless link to obtain general connectivity to the Internet or to other wide area networks. In some implementations a STA may also be used as an AP.

An AP may also comprise, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, or some other terminology.

A STA may also comprise, be implemented as, or be known as an access terminal (AT), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

Before a device may begin using a network, the device may need to identify an AP for the network. The device may discover an AP by transmitting or receiving signals. For example, a device may discover an AP by receiving a beacon signal from the AP. Alternatively, a device may discover an AP by broadcasting a request for services. An AP may then respond to the broadcast request. In some implementations, many devices may be trying to identify an AP for the network. Each AP may need to service these devices by transmitting signals to the devices or receiving signals from many devices. For example, when several devices move into the vicinity of a new network and transmit messages for link set up, the resulting rate of collisions can introduce latencies during link set up.

Various techniques may be employed to reduce the link set up time to allow a device to access the network. However, additional signaling may be needed for the device to perform an action on the network. For example, before a device may communicate with a node or server over the network, the device may need to obtain a network address for the node or server. One type of signaling used to obtain a network address includes DNS querying. A request for domain name resolution may include a hostname or domain name for a node or server operating on a network. A response to a request for domain name resolution may include a network address that the requesting node may use to communicate with the node or server.

A request for domain name resolution may be transmitted by the device or an application associated with the device. In an embodiment, the query provides a name for a network location of interest. In response, an address such as an IP address may be provided identifying the location on the network. A device may reduce link setup time by minimizing the time required to complete this query. For example, there may be latency associated with performing a DNS system query. First, the DNS query must be generated and transmitted to a DNS server. Once the DNS server receives the DNS query, additional latency may be introduced as the DNS server searches one or more databases or other data structures to determine how to respond to the query. Additional latency may be introduced while the DNS server generates a response and then the response is transmitted via the network back to the original requesting electronic device. Accordingly, improved methods and systems for enhanced DNS querying within wireless communication systems are desirable.

One method to manage latency in a network system is to perform operations in parallel. For example, if a plurality of processes is performed serially, the time required to complete all of the processes will be at least the sum of the time required to perform each process individually. If the plurality of processes is performed in parallel, the time required to complete all of the processes may be as low as the time necessary to complete the longest process.

Some of the disclosed embodiments parallelize a process of establishing communication with a server over a wireless communications network, i.e., conducting certain network processes simultaneously. By performing some processes associated with establishing the communication in parallel, the latency associated with establishing communication over a wireless communication system may be reduced when compared to serialized communication establishment processes.

In one aspect, the process of establishing communication with a server is parallelized by requesting a network address for a station earlier in a communication establishment process than known methods. By requesting the network address earlier, a response may be received from a network address assignment server earlier in the process as well.

In another aspect, the need for a station to perform duplicate address detection (DAD) before utilizing a network address may be reduced or eliminated. By allowing an AP to assign interface identifiers for stations with which it is associated, the AP maintains centralized control, helping to ensure that interface identifiers are not duplicated across the associated stations. This may reduce the need for the stations to perform duplicate address detection before utilizing a network address formed at least in part based on the interface identifiers.

In another aspect, by performing certain of the processes disclosed herein in parallel, a station may be relieved of the requirement to perform address resolution protocol (ARP) prior to initiating communication with another station within the same network. In this aspect, an AP may transmit a mapping to every station associated with the AP. Such a mapping may comprise a network address of each associated station, linked to a corresponding MAC address. The receiving stations may cache or otherwise store the mapping and using the information provided, initiate direct communication with another station in the network without performing an ARP to obtain an associated MAC address.

In another aspect, latency in establishing communication may be reduced by an AP providing network address information for a DNS server to a station. For example, the AP may provide an IP address for the DNS server and/or a MAC address for the DNS server. In some aspects, the AP may provide an IP address for a gateway to which DNS queries can be transmitted by the STA. This network address information may be provided to the station as part of an association request/reply message exchange. In another aspect, the network address information may be provided in an authentication request/reply exchange. By providing this information to the station, the need for the station to resolve the network address information for the DNS server independently may be reduced, thus reducing the time necessary to establish communication.

In another aspect, latency in establishing communication may be reduced by a network address assignment server transmitting or otherwise providing to an AP, a mapping of the network addresses assigned to other devices (e.g., STAs) within the network to corresponding network access identifiers of those other devices in the network. A STA may then transmit an association request to the AP, with the association request indicating a network address requested by the station for use on the network. The AP may search for the requested network address in the mapping. If found, the AP may determine whether the requested network address is mapped to the station's network access identifier. If it is, the requested network address may be assigned to the station. Because the mapping is provided to the AP, assignment of the network address to the station may be performed without exchanging messages with the network address authentication server (e.g., NDP, ARP, etc.), thus reducing the messaging overhead and latency associated with establishing the communication.

Referring initially to FIG. 1, an exemplary wireless communication system is shown. The wireless communication system 100 may operate pursuant to a wireless standard, for example the 802.11ah standard. The wireless communication system 100 may include an AP 104, which communicates with STAs such as a mobile phone 106a, a television 106b, a computer 106c, or another AP 106d (individually or collectively hereinafter identified by 106).

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may provide wireless communication coverage in a basic service area (BSA) 102. The AP 104 along with the STAs 106 associated with the AP 104 and that are configured to use the AP 104 for communication may be referred to as a basic service set (BSS). It should be noted that the wireless communication system 100 may not have a central AP 104, but rather may function as a peer-to-peer network between the STAs 106 (e.g., in a WLAN or 802.11 connection). Accordingly, the functions of the AP 104 described herein may alternatively be performed by one or more of the STAs 106.

A variety of methods exist for a STA 106 to associate with an AP 104. According to one method, the STA 106 transmits a request to a detected AP 104. In some implementations, this request may be referred to as a probe request. According to another method, the AP 104 may transmit a signal including information that may be used by a STA to associate with the AP 104. In some implementations, this signal may be referred to as a beacon signal. The probe request or beacon signal may include information including an identifier such as a service set identifier (SSID), an indicator specifying the data rates the STA 106, and/or AP 104 is capable of communicating with, an authentication challenge value (e.g., anonce), or other access information.

In some implementations, the STA 106 initiates an association procedure and, once associated, transmits DNS queries. Because the association procedure and DNS procedure are performed serially in these implementations, a delay in processing of the DNS query may be experienced, as the DNS query may be queued at the STA 106 until association is completed. In some implementations, the STA 106 may transmit the DNS queries to the AP 104 where the queries may be processed and re-associated with the requesting STA 106. In either implementation, a delay may be introduced in addition to the additional resources that may be needed to manage the queries submitted prior to completion of the association.

In some disclosed implementations, the STA 106 may include one or more DNS queries as part of the association procedure. For example, the STA 106 may include an information element in the association request frame which includes one or more DNS queries. A DNS query may include a full URL (Universal Resource Locator) to a network location, the top-level domain name of a network location, or other information identifying a network location. In such implementations, the AP 104 may begin processing the DNS queries as the association procedures are completed. In some implementations, the DNS queries will be processed in parallel with at least some of the association procedures. Once the association procedures are completed, any DNS query results that have been received may be included in the association response signal. For example, the AP 104 may be configured to include the DNS query responses in an information element of an association response frame.

Figure 2:
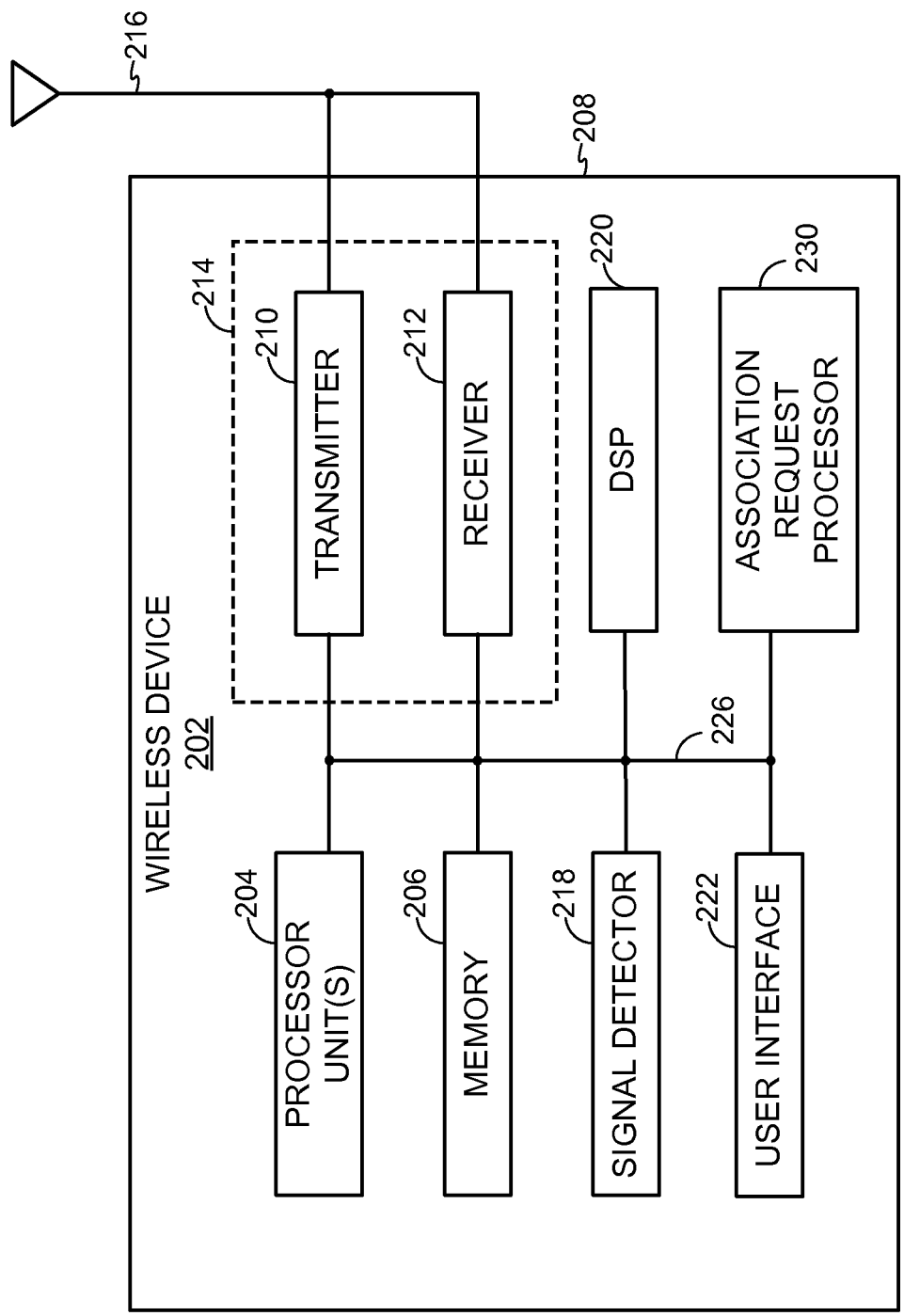
FIG. 2 shows a functional block diagram of an exemplary wireless device that may be employed within the wireless communication system of FIG. 1.

FIG. 2 shows a functional block diagram of an exemplary wireless device that may be employed within the wireless communication system of FIG. 1. The wireless device 202 is an example of a device that may be configured to implement the various methods described herein. For example, the wireless device 202 may comprise the AP 104 or one of the STAs 106. Accordingly, the various components discussed below may be incorporated in either an AP 104 or a STA 106, as required.

The wireless device 202 may include processor unit(s) 204 which controls operation of the wireless device 202. One or more of the processor unit(s) 204 may be collectively referred to as a central processing unit (CPU). Memory 206, which may include both read-only memory (ROM) and random access memory (RAM), provides instructions and data to the processor units 204. A portion of the memory 206 may also include non-volatile random access memory (NVRAM). The processor unit(s) 204 may be configured to perform logical and arithmetic operations based on program instructions stored within the memory 206. The instructions in the memory 206 may be executable to implement the methods described herein.

The processor unit(s) 204 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. In an implementation where the processor unit(s) 204 comprises a DSP, the DSP may be configured to generate a packet (e.g., a data packet) for transmission. In some aspects, the packet may comprise a physical layer data unit (PPDU).

The wireless device 202 may also include machine-readable media for storing software. The processing unit(s) 204 may comprise one or more machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processor unit(s) 204, cause the wireless device 202 to perform the various functions described herein.

The wireless device 202 may include a transmitter 210 and/or a receiver 212 to allow transmission and reception, respectively, of data between the wireless device 202 and a remote location. The transmitter 210 and receiver 212 may be combined into a transceiver 214. An antenna 216 may be attached to the housing 208 and electrically coupled with the transceiver 214. The wireless device 202 may also include (not shown) multiple transmitters, multiple receivers, multiple transceivers, and/or multiple antennas.

The transmitter 210 may be configured to wirelessly transmit packets and/or signals. For example, the transmitter 210 may be configured to transmit different types of packets generated by the processor unit(s) 204, discussed above. The packets are made available to the transmitter 201. For example, the processor unit(s) 204 may store a packet in the memory 206 and the transmitter 201 may be configured to retrieve the packet and transmit the packet via the antenna 216.

An antenna 216 of wireless device 202 detects wirelessly transmitted packets/signals. The receiver 212 may be configured to process the detected packets/signals and make them available to the processor unit(s) 204. For example, the receiver 212 may store the packet in memory 206 and the processor unit(s) 204 may be configured to retrieve the packet.

The wireless device 202 may also include a signal detector 218 that may be used in an effort to detect and quantify the level of signals received by the transceiver 214. The signal detector 218 may detect such signals as total energy, energy per subcarrier per symbol, power spectral density, and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user. The wireless device 202 may also include a housing 208 surrounding one or more of the components included in the wireless device 202.

The wireless device 202 may also include an association request processor 230. The association request processor 230 may be configured to process signals to associate a wireless device with a wireless network. In some implementations the signal may be referred to as an association request, a service request, or an attachment request. While shown here as a standalone component of wireless device 202, the association request processor 230 and associated functions may also be implemented within the DSP 220 or processor unit(s) 204 or other appropriate subsystems.

When the wireless device 202 is implemented as a STA 106, the association request processor 230 may be configured to obtain one or more DNS queries from applications executing on the wireless device 202. The DNS queries may be included in the association request as will be described. In some implementations, the DNS queries may be transmitted after an association request, but prior to completing the association of the wireless device 202 with the network.

When the wireless device 202 is implemented as an AP 104, the association request processor 230 may be configured to process DNS queries for a device prior to completing the association with the device. An association request processor 230 that may be included in an AP 104 will be described in further detail below, such as in reference to FIG. 4.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor unit(s) 204 may be used to implement not only the functionality described above with respect to the processor unit(s) 204, but also to implement the functionality described above with respect to the signal detector 218 or the association request processor 230. Further, each of the components illustrated in FIG. 2 may be implemented using a plurality of separate elements.

Figure 3:
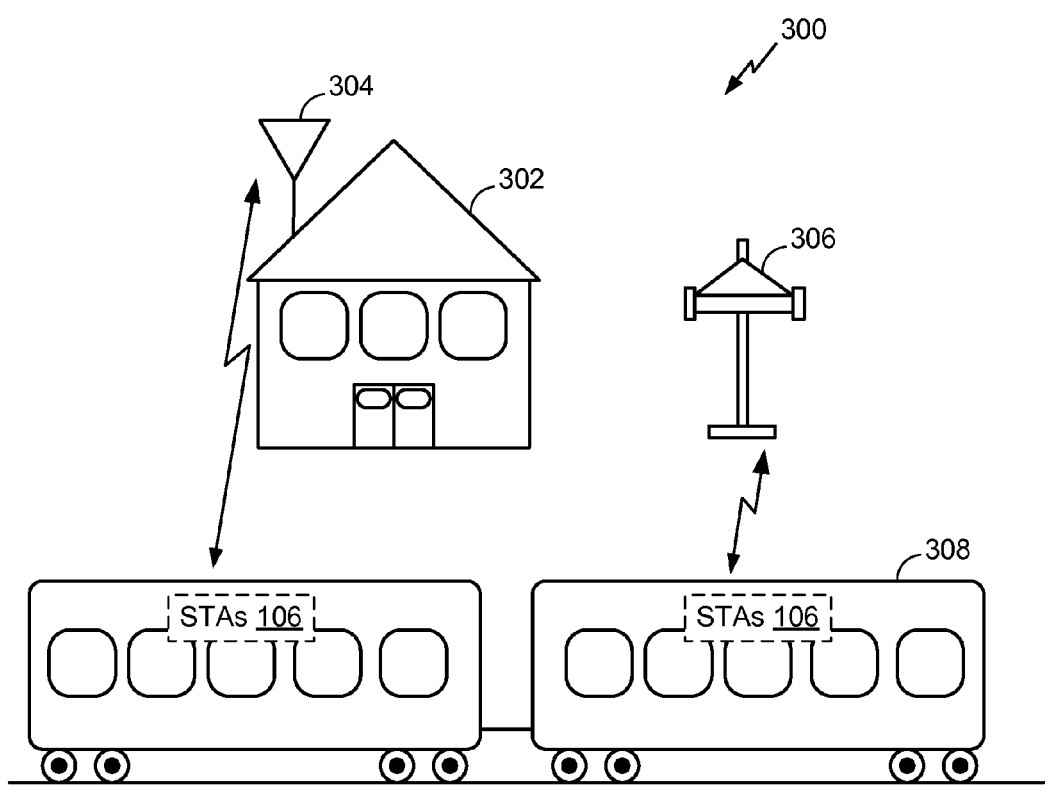
FIG. 3 shows an exemplary implementation of a wireless communication system.

FIG. 3 shows an exemplary implementation of a wireless communication system. The wireless communication system 300 shown in FIG. 3 is shown as a railway depot. On the roof of the railway depot 302, a first AP 304 is installed. Proximate to the railway depot 302, a second AP 306 may be installed. A train 308 may arrive at the railway depot 302 carrying passengers having one or more STAs 106 which are configured to communicate wirelessly.

As a vehicle such as train 308 moves, the STAs 106 (shown in dashed lines) on the interior of the train (e.g. in possession of passengers) may require services from the first AP 304 and second AP 306. As the train 308 moves and various STAs 106 attempt to associate with first AP 304 or second AP 306, the speed with which a connection or associated is made becomes increasingly important. Delays in communication may become detrimental to effective data transfer where the train is moving through the depot 302 and in and out of range of each of the first AP 304 and second AP 306.

In explaining various aspects of the disclosure, the train-based communication system of FIG. 3 may be used. It should be appreciated, however, that the methods and systems described herein are applicable in a variety of wireless communication systems, not just transportation settings, where a moving STA 106 may require fast initial link setup for communications. Other implementations may include a traffic signal AP to allow car drivers to attach to a network, a parking meter AP to allow STAs on the street (e.g., drivers, pedestrians, cyclists) to attach to a network, a library, etc.

Figure 4A:
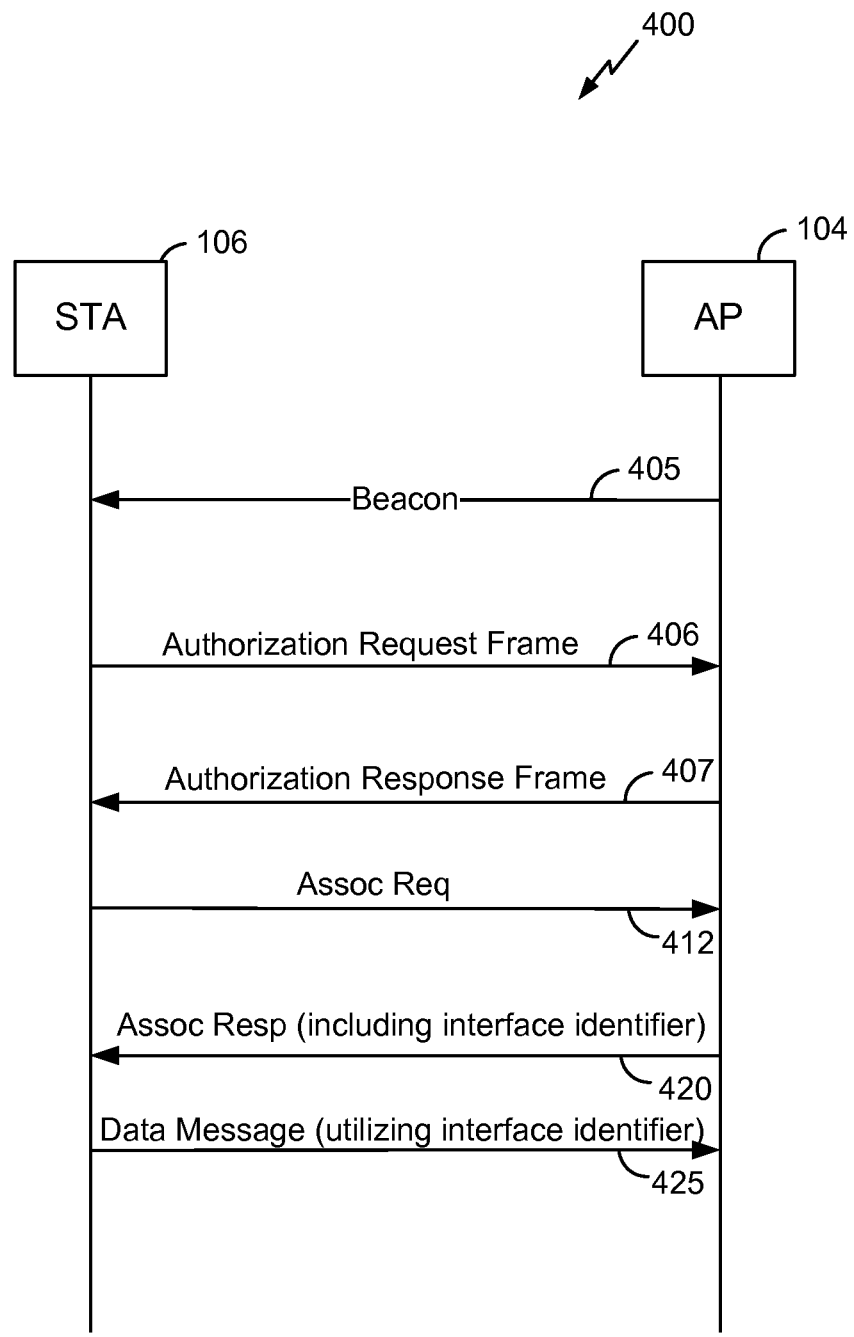
FIG. 4A shows a call flow diagram for an example of reducing latency when establishing communication in a wireless communication system.

FIG. 4A shows a call flow diagram 400 for an example association request and reply message exchange between a STA 106 and an AP 104 that implements one of the disclosed embodiments. Specifically, the aspect illustrated by FIG. 4A may provide for reduced latency when establishing communication on a wireless network due to a reduced need to perform duplicate address detection by a STA. In current methods, a STA may determine a network address (e.g., an IP address, local network address, etc.) based at least in part on an interface identifier the STA selects. Because the STA is selecting the interface identifier, it may select an interface identifier that has been previously selected by another STA, i.e. a duplicate address. In some aspects, these duplicate interface identifiers may be used to form duplicate network addresses used on the wireless network, which is undesirable and may lead to inefficiencies within the network. To avoid duplicate addresses, after a STA selects its own interface identifier, it may perform a duplicate address detection process. For example, IP Version-6 (IPv6) implementations may use the Neighbor Discovery Protocol (NDP) to perform duplicate address detection. To reduce the need for a STA to perform duplicate address detection, and reduce the amount of time required to provide an address, an AP in the proposed methods and systems uses a centralized method to determine an interface identifier for each STA associated with the AP. The determined interface identifier is then communicated to the STA, in some aspects in an association response message. Because the AP determines interface identifiers for all STAs associating with it, the AP can ensure no interface identifiers are duplicated across the associated STAs. Because no interface identifiers are duplicated, the associated STAs will not be assigned duplicate network addresses, assuming the interface identifier comprises a portion of the network addresses for the associated STAs. Using such a centralized method for the assignment of network identifiers and reducing or eliminating the requirement for a STA to perform duplicate address detection, the proposed solution illustrated in FIG. 4A may reduce latency associated with establishing communication over a wireless network.

The call flow diagram 400 includes several entities which may be associated with a wireless communication network. The call flow may be initiated when the AP 104 transmits a signal 405. The signal 405, as shown in FIG. 4A is a beacon signal. The signal 405 may include information that a STA may use to associate with the wireless communication network.

The STA 106 may receive the signal 405. Based on the received signal 405, the STA 106 may be configured to associate with the AP 104. The STA 106 may be configured to transmit a signal 406 requesting authorization. In some aspects, the authorization request message 406 may include a network access identifier. The AP 104 may respond to the authorization request message 406 by transmitting an authorization response message 407. The STA 106 may then request association with the wireless communication network to the AP 104 by transmitting a signal 412. The signal 412 may be an association request signal. In implementations utilizing LTE, the message 412 may be an Attach Request. The signal 412 may include an indication of the number or type of interface identifiers requested by the STA 106. In some aspects, the signal 412 may indicate a number of interface identifiers (e.g. a total number) requested by the STA.

In some implementations, the signal 412 is transmitted via a level 2-MAC basis. This link layer signaling allows the association request to be submitted prior to full association and authentication with the network. In LTE or UMTS based systems, the signal 412 may be transmitted via NAS (Non-Access Stratum). In such systems, the packet gateway may be configured to service the signal 412. In HRPD or cdma1x based systems, the signal 412 may be transmitted via PPP/Mobile-IP. In such systems, the home agent (HA) or packet state switching node (PDSN) may be configured to service the signal 412.

The AP 104 may process the signal 412 as part of the association procedures. As part of that signal processing, the AP 104 may determine one or more interface identifiers to assign to the STA 106. The one or more interface identifiers may be determined based on a pool of interface identifiers maintained by the AP 104. Alternatively, the AP 104 may determine the one or more interface identifiers by requesting interface identifiers from another entity, for example, a Dynamic Host Configuration Protocol (DHCP) server.

The AP 104 may generate an association response signal 420. The association response signal may indicate one or more interface identifiers. In some aspects, the interface identifiers may comprise a portion of an IPv6 address assigned by the AP for the STA. Upon receiving the one or more interface identifiers from the AP 104, the STA 106 may determine one or more network address based on the one or more interface identifiers. For example, the STA 106 may determine an IP address based on a prefix included in the beacon 410 signal and based on an interface identifier indicated by the signal 420.

The STA 106 may then send a data message 425 utilizing the determined network address. For example, the STA 106 may use the determined network address to communicate over the wireless network.

Figure 4B:
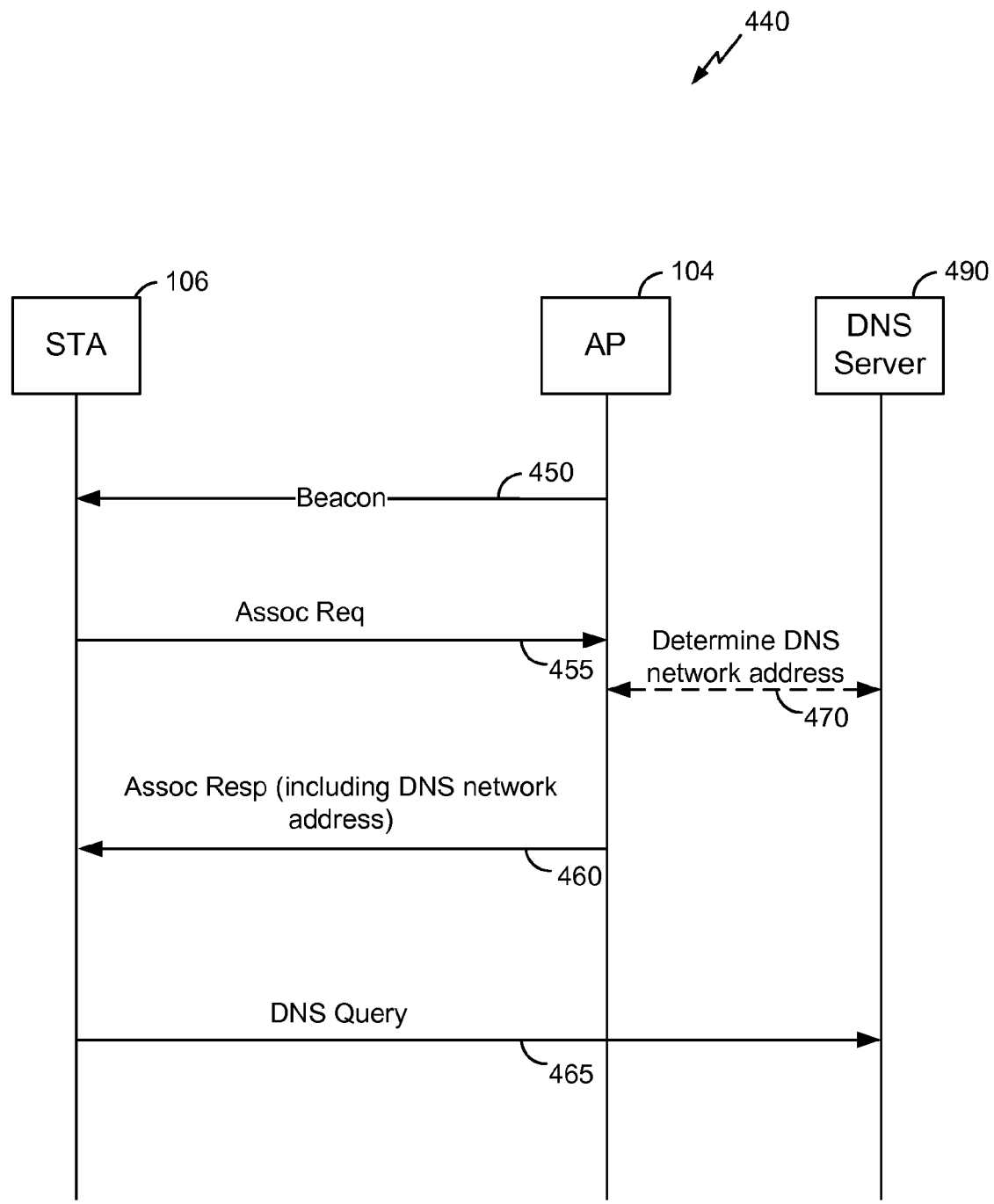
FIG. 4B shows a call flow diagram for an example of reducing latency when establishing communication in a wireless communication system.

FIG. 4B shows a call flow diagram 440 for an example association request and reply message exchange between a STA 106 and an AP 104 that implements one of the disclosed embodiments. Specifically, the embodiment illustrated in FIG. 4B may provide for reduced latency when establishing communication on a wireless network by reducing the need for a STA to perform independent or separate signaling to resolve a network address and/or MAC address of a DNS server. An AP 104 in the disclosed methods and systems provides the network address information for the DNS server to the STA 106. In some aspects, this is provided in an association reply transmitted from the AP 104 to the STA 106. Because the STA then has the network address information of the DNS server available, the STA 06 can initiate communications with the DNS server without the need to first perform signaling to resolve the DNS server address.

The call flow diagram includes several entities which may be associated with a wireless communication network. The call flow may be initiated when the AP 104 transmits a signal 450. The signal 450, as shown in FIG. 4B is a beacon signal. The signal 450 may include information that the STA 106 may use to associate with the wireless communication network.

The STA 106 may receive the signal 450 which may for example, be a beacon signal. Based on the received signal 450, the STA 106 may be configured to associate with the AP 104. The STA 106 may be configured to transmit a signal 455 requesting association with the wireless communication network to the AP 104. The signal 455 may, for example, be an association request signal. In implementations utilizing LTE, the message 455 may be an Attach Request.

In some implementations, the signal 455 is transmitted via a level 2-MAC basis. This link layer signaling allows the association request to be submitted prior to full association and authentication with the network. In LTE or UMTS based systems, the signal 455 may be transmitted via NAS. In such systems, the packet gateway may be configured to service the signal 455. In HRPD or cdma1x based systems, the signal 455 may be transmitted via PPP/Mobile-IP. In such systems, the home agent (HA) or packet state switching node (PDSN) may be configured to service the signal 455.

The AP 104 may process the signal 455 as part of the association procedures. As part of that signal processing, the AP 104 may determine network address information for the DNS server 490 during a signal exchange 470, shown in dashed lines. The double ended arrow of signal exchange 470 indicates an information exchange between the AP 104 and the DNS server 490, such as a DNS network address query and response. For example, the AP 104 may determine an IP address for the DNS server 490 in some aspects. In some aspects, the AP 104 may also determine a MAC address for the DNS server 490 during signal exchange 470. In some embodiments, the signal exchange 470 may occur at any time previous to the association response (including the DNS network address) sent with a signal 460, discussed below.

The AP 104 may generate an association response signal 460. The association response signal may indicate network addressing information for the DNS server 490. For example, the association response signal 460 may indicate an IP address of the DNS server and/or a MAC address of the DNS server.

The STA 106 may then send a DNS query 465 to the DNS server using the network address information provided by the AP 104 in the association response message 460. Note that the STA 106 may communicate with the DNS server 490 without the need for independent signaling to obtain the network address information of the DNS server that was instead provided by the AP 104. This may result in reduced latency in the STA 106 establishing communication on the wireless network.

Figure 5A:
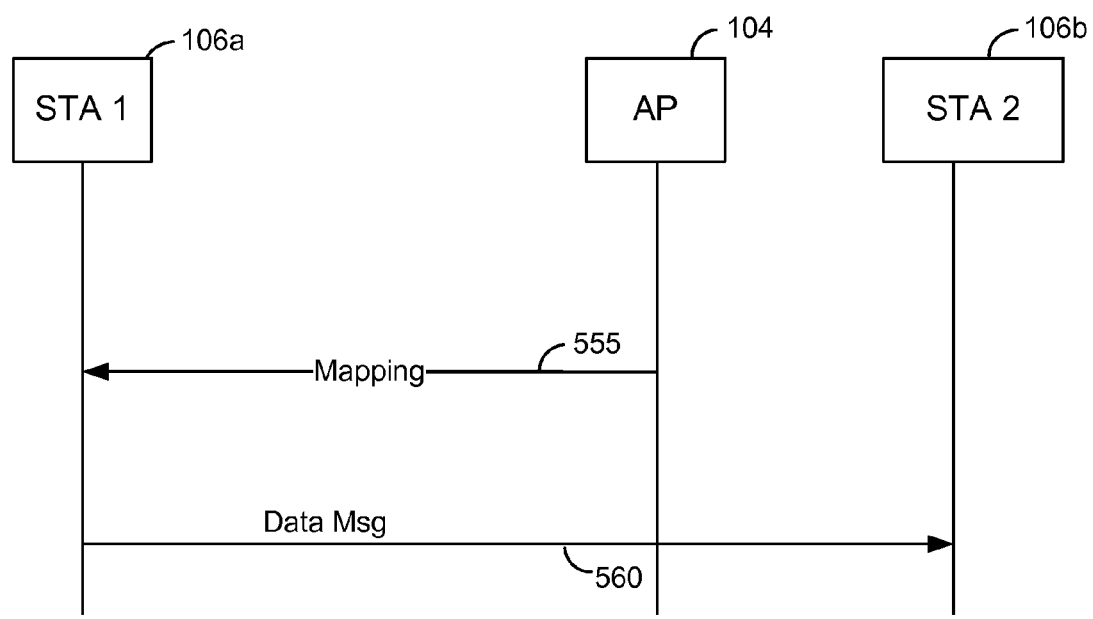
FIG. 5A shows a call flow diagram for an example of reducing latency when establishing communication in a wireless communication system.

FIG. 5A shows a call flow diagram for an example message exchange between a first STA 106a, an AP 104, and a second STA 106b that implements one of the disclosed embodiments. Specifically, the embodiment illustrated in FIG. 5A may provide for reduced latency when establishing communication on a wireless network by reducing the need for a first STA to perform independent or separate signaling to resolve a network address and/or MAC address of a second STA. Instead, an AP in the disclosed methods and systems provide the network address information for the second STA to the first STA. Because the first STA has the network address information of the second STA available, it can initiate communications with the second STA without the need to first perform signaling to resolve the address information of the second STA.

The call flow diagram includes several entities which may be associated with a wireless communication network. The call flow includes a first STA 106a, an AP 104, and a second STA 106b. The first STA 106a may receive a mapping signal or message 555 from the AP 104. The message 555 may include a mapping of the second STA's 106b network address to the second STA's 102b MAC address. In some aspects, the mapping message 555 includes mapping information for a plurality of stations. In some aspects, the mapping message 555 is transmitted by the AP 104 asynchronously, without a preceding request from the first STA 106a. In some aspects, the mapping message 555 may be broadcast or multicast to all or a plurality of STAs 106 associated with the AP 104.

Upon receiving the mapping message 560, the first STA 106a may then initiate communication with second STA 106b via data message 560 without the need to, perform address resolution signaling to obtain the second STA's 106b MAC address (for example, by exchanging ARP messages with the second STA 106b). This may enable communication to be established with the second STA 106b with reduced latency when compared to known methods.

Figure 5B:
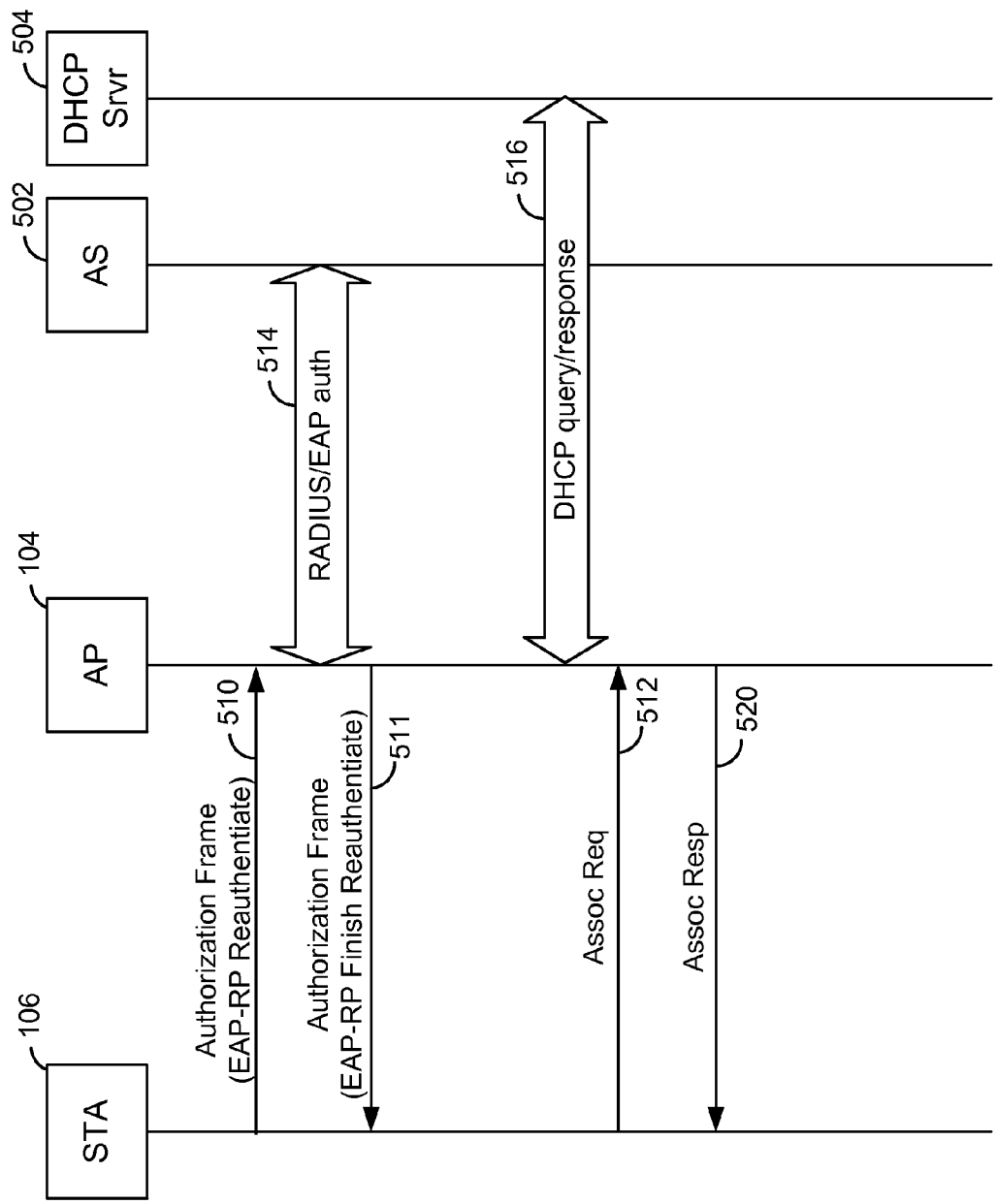
FIG. 5B shows a call flow diagram for an example of reducing latency when establishing communication in a wireless communication system.

FIG. 5B shows a call flow diagram for an example message exchange between a STA 106, an AP 104, and a network address assignment server 504 (shown as a DHCP server in the illustrated embodiment) that implements one of the disclosed embodiments. Specifically, the embodiment illustrated in FIG. 5B may provide for reduced latency when establishing communication on a wireless network by performing a larger portion of the processing necessary to establish communication for the STA 106 in parallel than with known or current methods. In current methods, an AP may not request a network address for a STA until it receives an association request from the STA. Delays introduced while waiting for the network address assignment server to respond can increase the amount of time a STA must wait to establish communication.

In the illustrated embodiment of FIG. 5B, the AP 104 initiates a request for a network address before receiving the association request from the STA 106. Because in some aspects, the network address assignment server 504 may utilize a network access identifier to assign a network address, the AP 104 may initiate the request for a network address after receiving an authorization frame from the STA 106. The authorization frame may include the network access identifier used by the network address assignment server. Because the request for a network address is initiated earlier in the communication establishment process than with current methods, the total elapsed time necessary to establish communication may be reduced when compared to current methods. Such a capability may prove advantageous in circumstances where a fast communication setup is desirable, as in the train scenario of FIG. 3.

The call flow diagram of FIG. 5B includes several entities which may be associated with a wireless communication network. The call flow includes STA 106, AP 104, authentication server (AS) 502, and network address assignment server 504, illustrated as a DHCP server in this embodiment. The STA 106 may transmit an authorization frame 510 to the AP 104. The authorization frame may include a network access identifier. For example, the network access identifier may identify a user who is requesting or has access to a wireless network.

In response to receiving the authorization frame 510, the AP may exchange messages with the authentication server 502 to determine whether a network access identifier indicated by the authorization frame 510 has access to a wireless network. The results of the authentication process may be transmitted to the STA 106 by the AP 104 in the authorization frame 511. In an embodiment, the authentication may be conducted using the Extensible Authentication Protocol (EAP) or EAP-RP format, as shown. The AP 104 may further utilize a Remote Authentication Dial In User Service (RADIUS) networking protocol to conduct the authentication.

Assuming the authorization was successful, the AP 104 may request a network address for the STA 106 from the network address assignment server 504 (DHCP server) and receive a response via message exchange 516. The STA 106 may then send an association request 512 to the AP 104. Note that while FIG. 5B shows the association request arriving at the AP 104 after the message exchange 516 has been completed, in some aspects, the association request 512 may be received by the AP 104 before a response is received from the network address assignment server 504.

The AP 104 may transmit an association response 520 to the STA 106 after receiving the association request 512. In some aspects, the association response 520 may indicate a network address assigned to the STA 106 by the AP 104 and/or the network address assignment server 504. In some aspects, the assignment of the network address may be based on a network access identifier indicted in the authorization frame 510 transmitted from the station.

Figure 6:
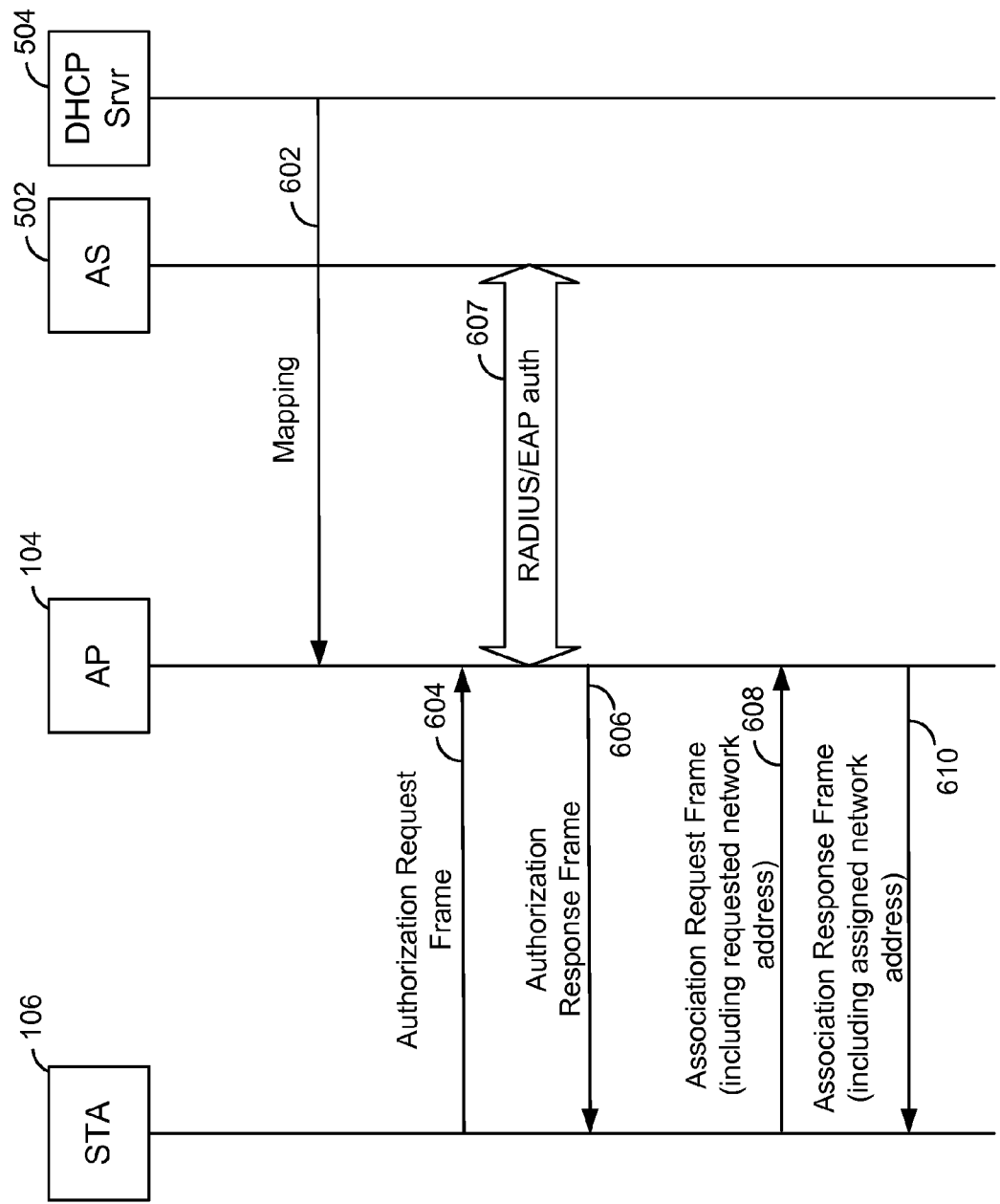
FIG. 6 shows a call flow diagram for another example of reducing latency when establishing communication in a wireless communication system.

FIG. 6 shows a call flow diagram for an example message exchange between a STA 106, an AP 104, and a network address assignment server 504 (shown as a DHCP server in the illustrated embodiment) that implements one of the disclosed embodiments. Specifically, the embodiment illustrated in FIG. 6 may provide for reduced latency when establishing communication on a wireless network by enabling an AP 104 to determine whether a network address requested for use by a STA 106 can be assigned to the STA 106 without requiring an independent query of a network address assignment server. This may again be desirable in situations where fast communications link setup is required, for example, a moving STA 106 or an individual with a wireless device (STA 106) aboard a train 308.

The call flow begins with a mapping message transmitted from the network address assignment server 504 (DHCP server) to the AP 104. The mapping message may indicate one or more mappings of network addresses (or various wireless devices, e.g., STA 106) to corresponding network access identifiers. In some aspects, the network addresses may be IP version-4 (IPv4) and/or IPv6 addresses. In some aspects, the mapping message may map one or more network addresses to corresponding subscription identifiers, or corresponding identifiers used for authentication of the STA 106 on the wireless network. The mappings may also indicate a time to live value for each mapping. While FIG. 6 shows the mapping message being transmitted by a network address assignment server, in some other aspects, the mapping message may be transmitted by a gateway (not shown), or one or more of a set of APs within a vicinity of the STA.

The AP 104 may then receive an authorization request frame 604 from the STA 106. After exchanging messages 607 with the authentication server 502, an authorization response frame is transmitted to the STA 106. The STA 106 may then transmit an association request frame 608 to the AP. The association request frame 608 indicates a requested network address (e.g., an IP address). Upon receiving the association request frame 608, the AP 104 may search the mapping provided by the network address assignment server 504 in message 602 for the requested network address. If it is found in the mapping, the AP 104 may then determine whether the mapping maps the requested network address to a network access identifier provided by the STA 106 in the authorization request frame 604. In some aspects, whether the requested network address is mapped to a network access identifier may be based on a time to live field in the mapping. For example, if a mapping entry has expired based on the time to live field, the mapping may not be considered by the AP 104.

If the AP 104 determines that the requested network address is mapped to the network access identifier specified in the authorization request frame 604 by the mapping provided in mapping message 602, then the AP 104 may transmit an association response frame 610 to the STA 106 that includes an assigned network address equivalent to the requested network address. Otherwise, the assigned network address may be different than the requested network address.

Figure 7:
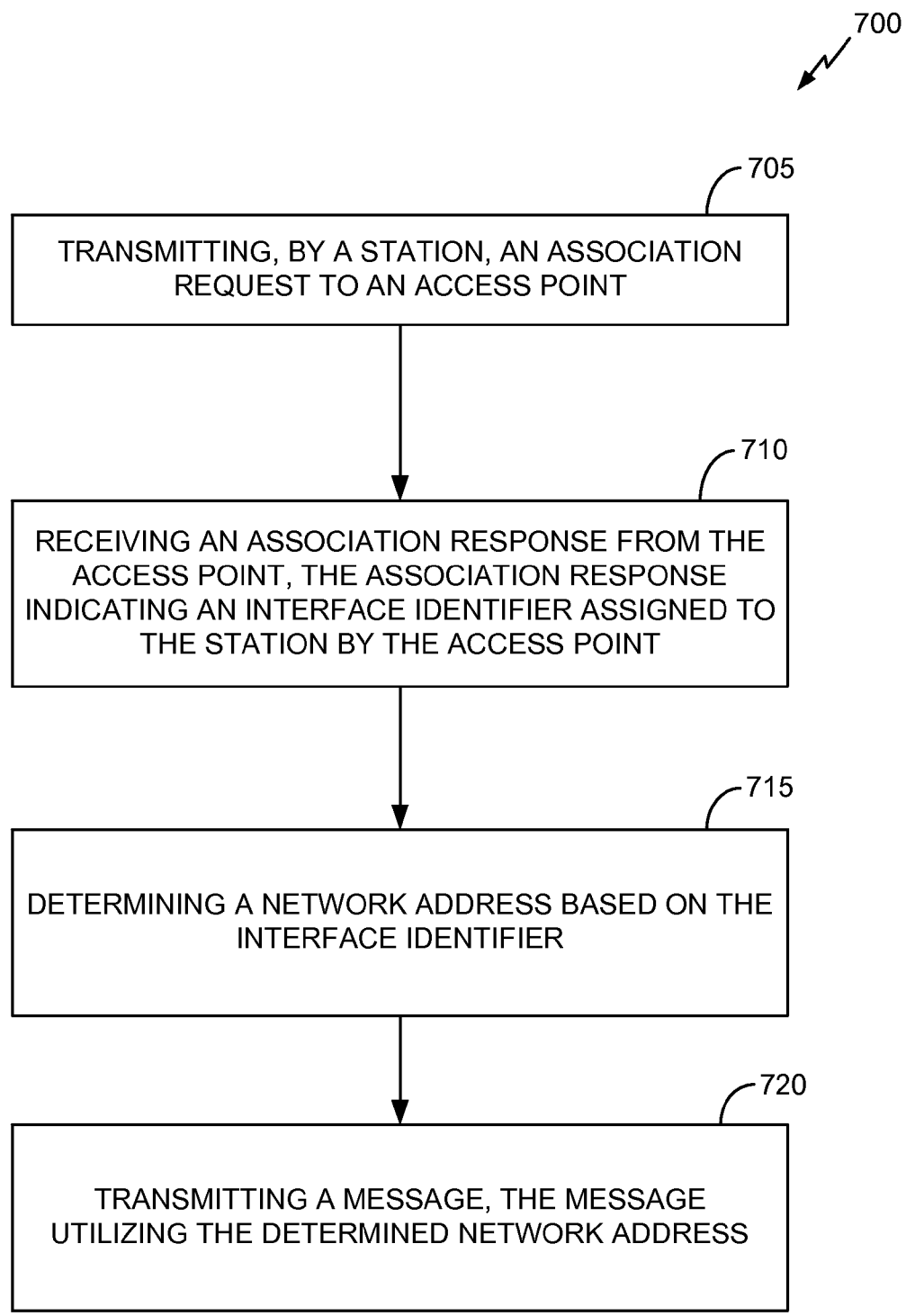
FIG. 7 shows a process flow diagram for a method of reducing latency in establishing communication in a wireless communication system.

FIG. 7 shows a process flow diagram for a method of reducing latency associated with establishing communication using a wireless communication system. The process may be performed in whole or in part by the devices described herein, such as that shown in FIG. 2 above or FIG. 17 below. In some implementations, the process 700 may be implemented in a STA, e.g., STA 106. In some aspects, by receiving an interface identifier from an AP 104 instead of generating the interface identifier itself, a STA 106 may avoid performing a duplicate address detection process after determining a network address to be used for network communication. Because the AP 104 assigns the interface identifier to the STA 106, the AP 104 may ensure no duplicate interface identifiers are provided to STAs 106.

The process begins at block 705, where an association request is transmitted by a station to an access point. In block 710, an association response is received from the access point. The association response indicates an interface identifier assigned to the station by the access point.

In block 715, a network address is determined based on the interface identifier. In some aspects the network address may be an IPv6 address. In these aspects, the network address may comprise a prefix portion and an interface identifier portion. The interface identifier portion may be comprised of the interface identifier assigned to the station by the access point. The prefix portion may be obtained from a beacon signal transmitted by the access point. Note that in some implementations of process 700, block 715 may not be performed.

In block 720, a message is transmitted. The transmitted message utilizes the determined network address. For example, the message may utilize the determined network address as a network address for routing the message through the internet from a transmitting station to a destination node. Note that in some implementations of process 700, block 720 is not performed.

The signals transmitted and/or received by process 700 may be similar to those shown in the call flows of FIG. 4A.

Figure 8:
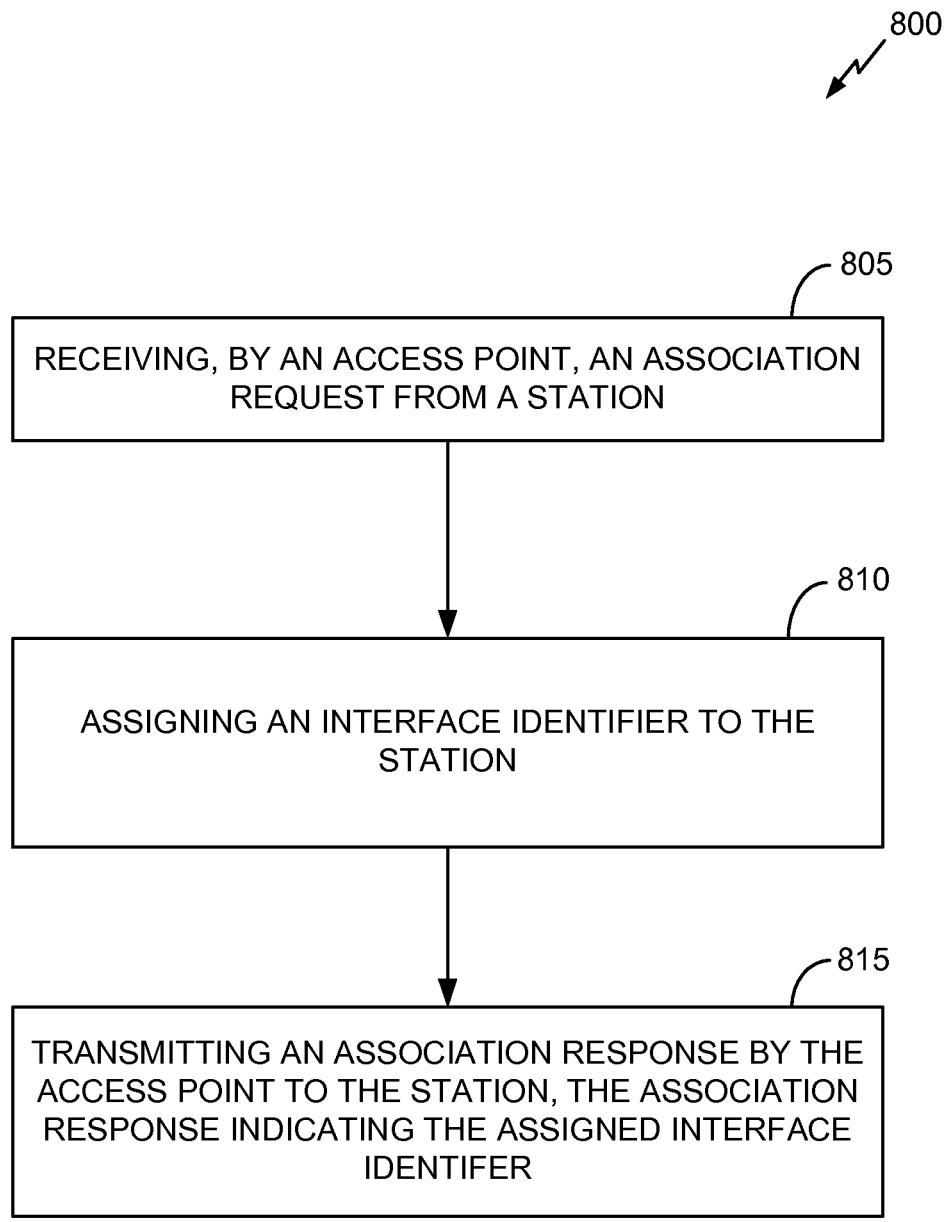
FIG. 8 shows a process flow diagram for a method of reducing latency in establishing communication in a wireless communication system.

FIG. 8 shows a process flow diagram for a method of reducing latency associated with establishing communication using a wireless communication system. The process shown may be performed in whole or in part by the devices described herein, such as that shown in FIG. 2 above or FIG. 17 below. In some implementations, the process may be implemented in an AP, e.g. AP 104. In some aspects, by assigning an interface identifier instead of having each station generate its own interface identifier, an access point can prevent the need for a station to perform a duplicate address detection process after the station determines a network address to be used for network communication. Because the access point assigns the interface identifier to the station, the access point may ensure no duplicate interface identifiers are provided to stations.

The process begins at block 805 where an association request is received by an access point. The association request is transmitted by a station. In block 810, an interface identifier is assigned to the station. In some aspects, an interface identifier forms a portion of a network address of the station (e.g., IPv6 addressing). In some aspects, an access point may maintain a pool of interface identifiers for assignment to the stations in the network. The access point may ensure that duplicate interface identifiers are not provided to different stations. In block 815, an association response is transmitted by the access point to the station. The association response indicates the assigned interface identifier from block 810. In some aspects, the station may then form a network address based on the interface identifier. For example, the station may form an IPv6 address using the assigned interface identifier. The signals transmitted and/or received in process 800 may be implemented in a STA 106 or AP 104, similar to those shown in the call flows of FIG. 4A.

Figure 9:
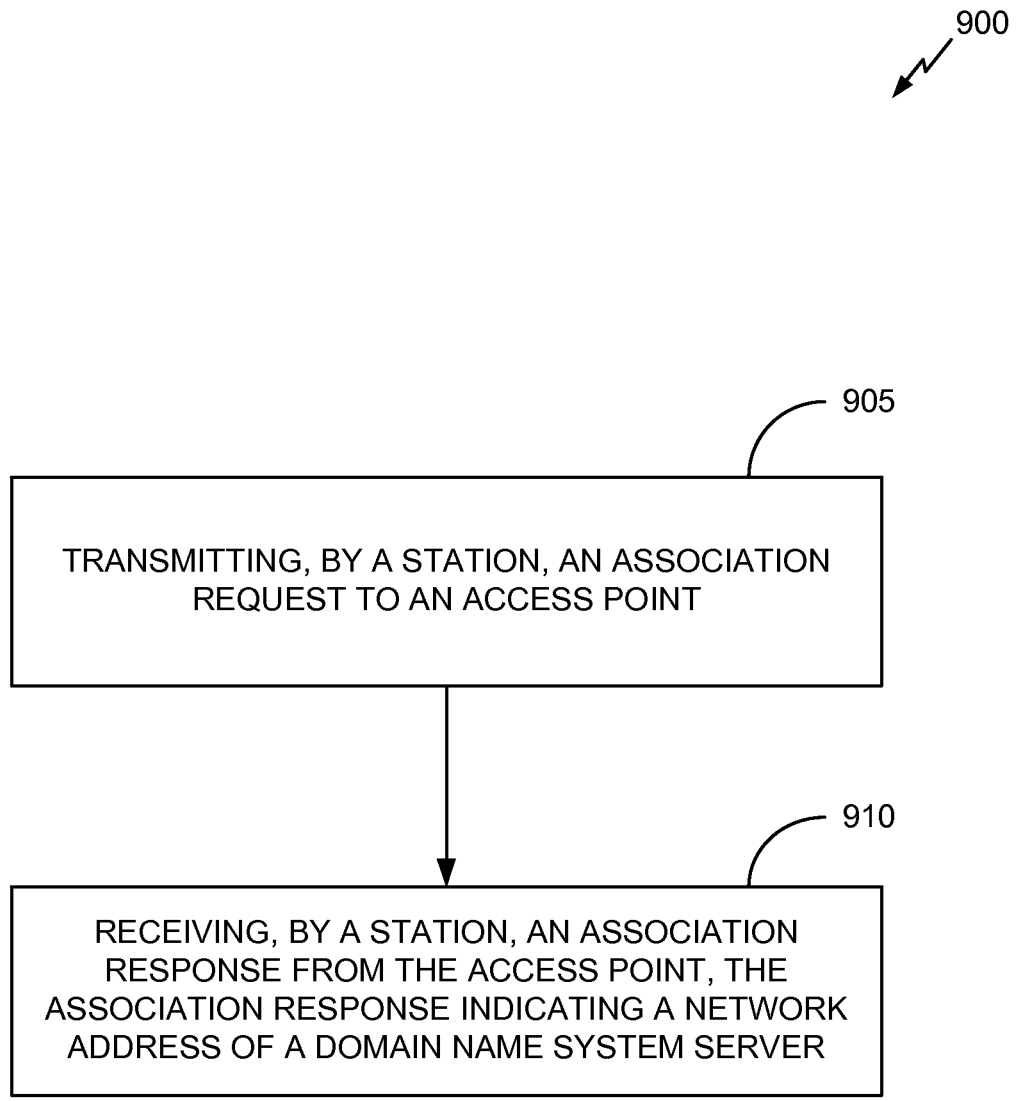
FIG. 9 shows a process flow diagram for a method of reducing latency in establishing communication in a wireless communication system.

FIG. 9 shows a process flow diagram for a method of reducing latency associated with establishing communication using a wireless communication system. The process shown may be performed in whole or in part by the devices described herein, such as that shown in FIG. 2 above or FIG.

17 below. In some implementations, the process may be implemented in a STA, e.g. STA 106. In some aspects, by receiving a network address of a DNS server as part of an association response message, a STA may not need to initiate separate signaling to obtain the network address information. This may enable the STA to initiate communication with the DNS server earlier in the communication establishment process when compared to existing methods.

The process 900 begins at block 905 where an association request is transmitted by a station to an access point. In block 910, the station receives an association response from the access point. The association response may indicate a network address of a DNS server. In some aspects, the network address is an IP address. In some of these aspects, the network address is an IPv4 address. In some other of these aspects, the network address is IPv6 address. In some aspects, the association response also includes a MAC address for the DNS server. In some other aspects, the association response may include a network address and/or a MAC address of a gateway that can be used by the station to communicate with a DNS server. In some aspects, process 900 may further include transmitting a DNS query to the DNS server based on the network address. In some of these aspects, the DNS query may also be transmitted based on the DNS server MAC address. The signals transmitted and/or received in process 900 may be implemented in a STA 106 or AP 104, similar to those shown in the call flows of FIG. 4B.

Figure 10:
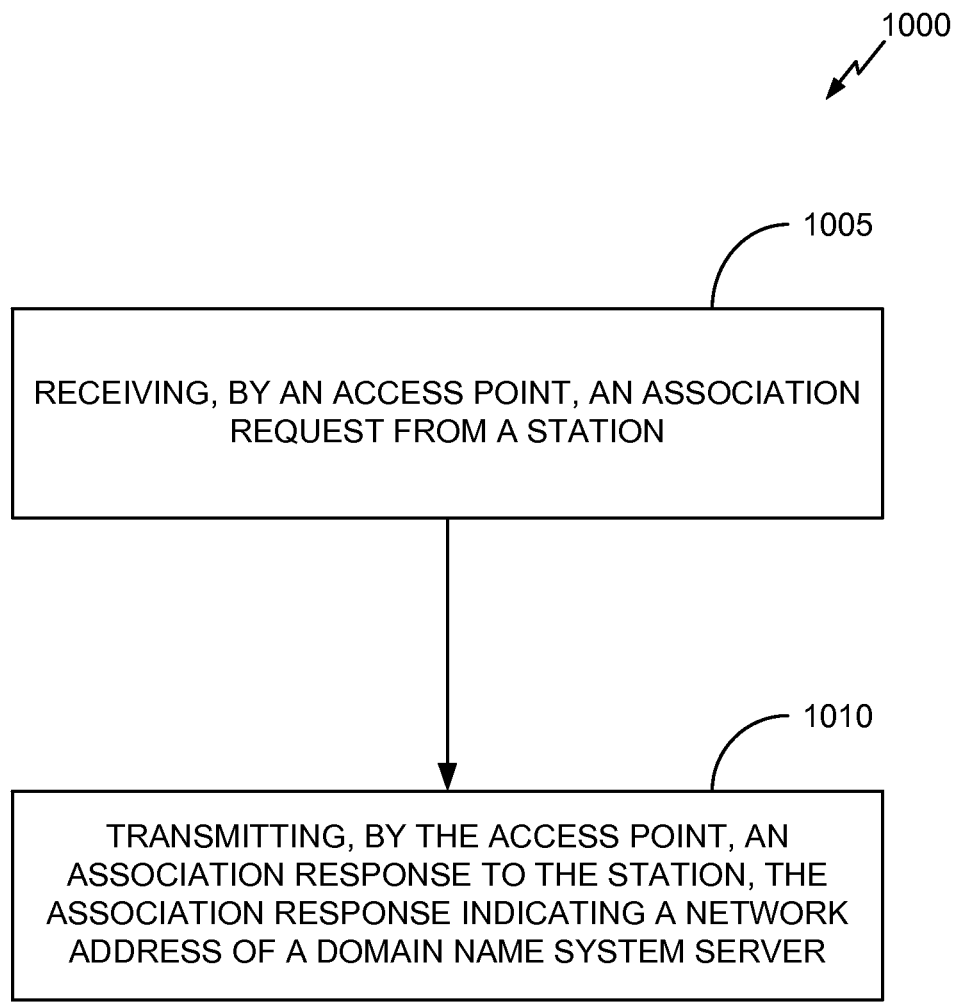
FIG. 10 shows a process flow diagram for a method of reducing latency in establishing communication in a wireless communication system.

FIG. 10 shows a process flow diagram for a method of reducing latency associated with establishing communication using a wireless communication system. The process shown may be performed in whole or in part by the devices described herein, such as that shown in FIG. 2 above or FIG. 17 below. In some implementations, the process may be implemented in an AP, e.g. AP 104. In some aspects, by transmitting a network address of a DNS server as part of an association response message, an AP can prevent the need for a STA to initiate separate signaling to obtain the network address information. This may enable the STA to initiate communication with the DNS server earlier in the communication establishment process when compared to existing methods.

The process 1000 begins at block 1005, where an association request from a station is received by an access point. In block 1010, an association response is transmitted by the access point to the station. The association response indicates a network address of a DNS server. In some aspects, the network address may be included in the association response. In some other aspects, the association response may also indicate a MAC address of the DNS server. In some of these aspects, the MAC address may be included in the association response. In some aspects, network address information for a plurality of DNS servers may be indicated by the association response message. In some aspects, the association response may indicate a network address and/or MAC address of a gateway that can be used by the station to communicate with a DNS server. In some of these aspects, the association response may not include a network address or MAC address of a DNS server. The signals transmitted and/or received by process 1000 may be implemented in a STA 106 or AP 104, similar to those shown in the call flows of FIG. 4B.

Figure 11:
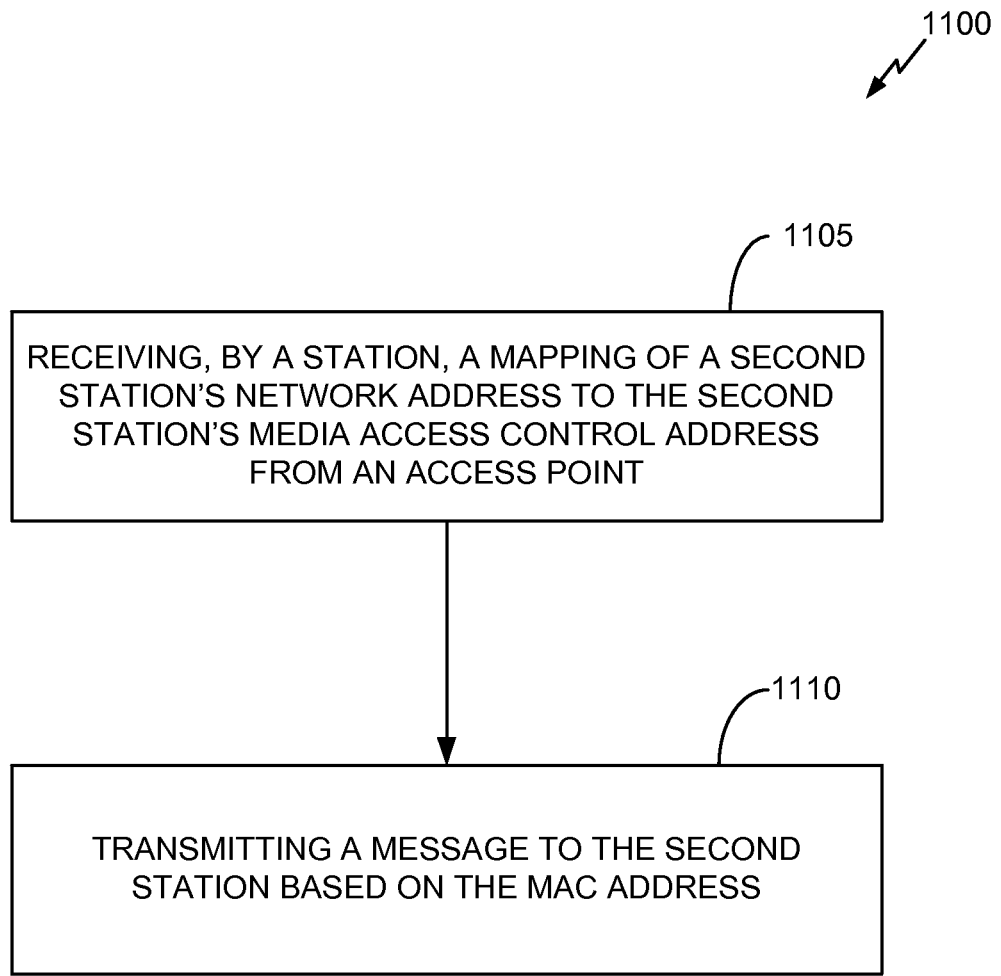
FIG. 11 shows a process flow diagram for a method of reducing latency in establishing communication in a wireless communication system.

FIG. 11 shows a process flow diagram for a method of reducing latency associated with establishing communication using a wireless communication system. The process shown may be performed in whole or in part by the devices described herein, such as that shown in FIG. 2 above or FIG. 17 below. In some implementations, the process may be implemented in a STA, e.g. STA 106. In some aspects, by receiving a mapping of a second stations network address to the second station's MAC address, a station performing process 1100 may not need to perform separate signaling to perform address resolution when communicating with the second station. This may enable the STA to initiate communication with the second station with less latency when compared to existing methods.

The process 1100 begins at block 1105, where a station receives a mapping of a second station's network address to the second station's MAC address from an access point. In some aspects, the network address is an IP address.

In block 1110, a message is transmitted to the second station based on the MAC address contained in the mapping. In some aspects, a mapping of one or more stations network address to station or MAC address may be received periodically from the access point. The signals transmitted and/or received in process 1100 may be implemented in a STA 106 or AP 104, similar to those shown in the call flows of FIG. 5A.

Figure 12:
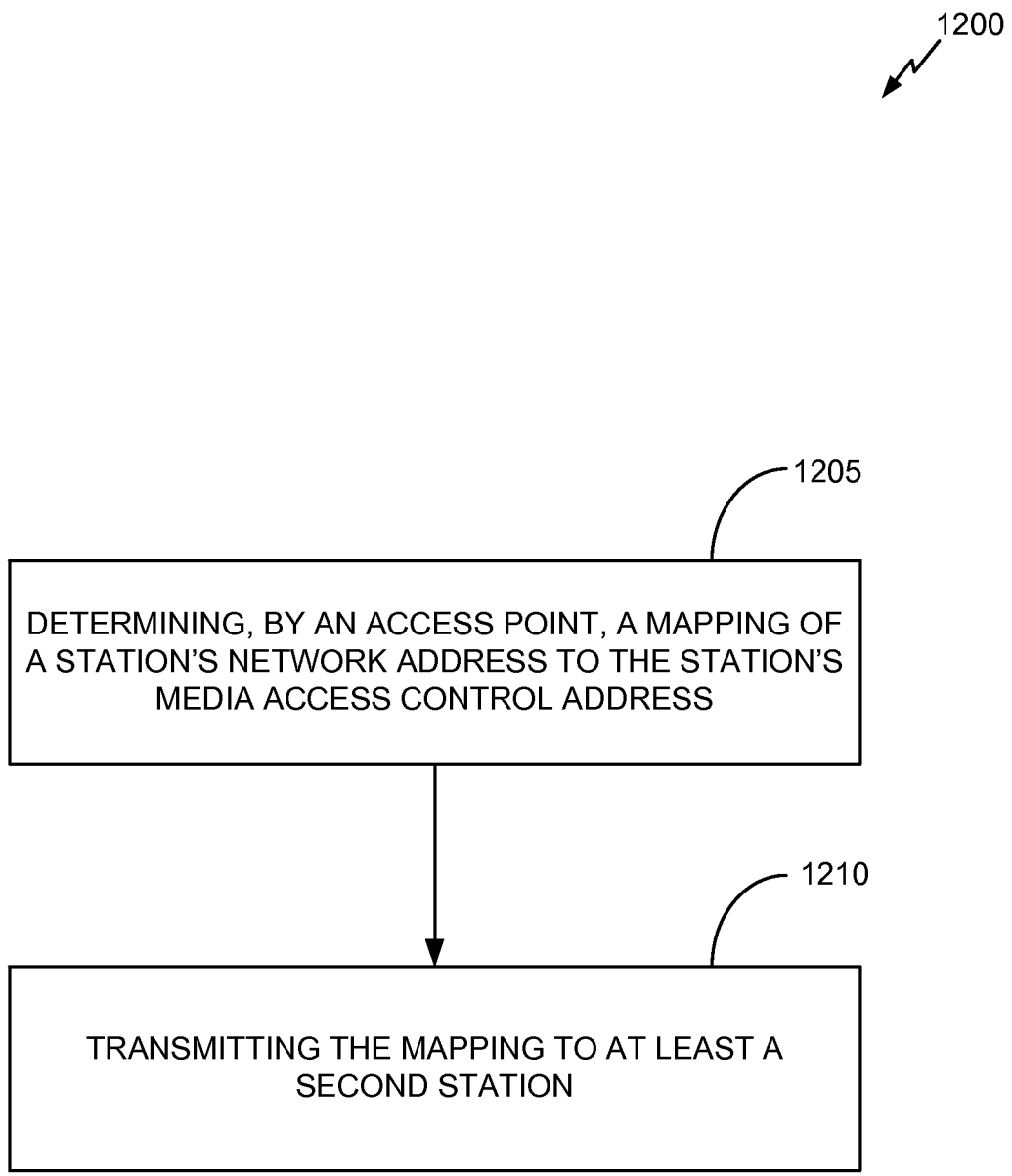
FIG. 12 shows a process flow diagram for a method of reducing latency in establishing communication in a wireless communication system.

FIG. 12 shows a process flow diagram for a method of reducing latency associated with establishing communication using a wireless communication system. The process shown may be performed in whole or in part by the devices described herein, such as that shown in FIG. 2 above or FIG. 17 below. In some implementations, the process may be implemented in an AP, e.g. AP 104. In some aspects, by transmitting a mapping of a station's network address to the station's MAC address, another station may not need to perform separate signaling to accomplish address resolution when communicating with the first station. This may enable the other STA to initiate communication with the first station with less latency when compared to existing methods.

The process 1200 begins at block 1205, where an access point determines a mapping of a station's network address to the station's MAC address. In some aspects, the station's network address is an IP address. The mapping may be determined when a network address is assigned to the station, either by the access point, or by a network address assignment server. In block 1210, the mapping is transmitted to at least a second station. The second station is a different station than the station discussed with respect to block 1205. In some aspects, the mapping may be broadcast or multicast to a plurality of stations within a basic service set. The signals transmitted and/or received in process 1200 may be implemented in a STA 106 or AP 104, similar to those shown in the call flows of FIG. 5A.

Figure 13:
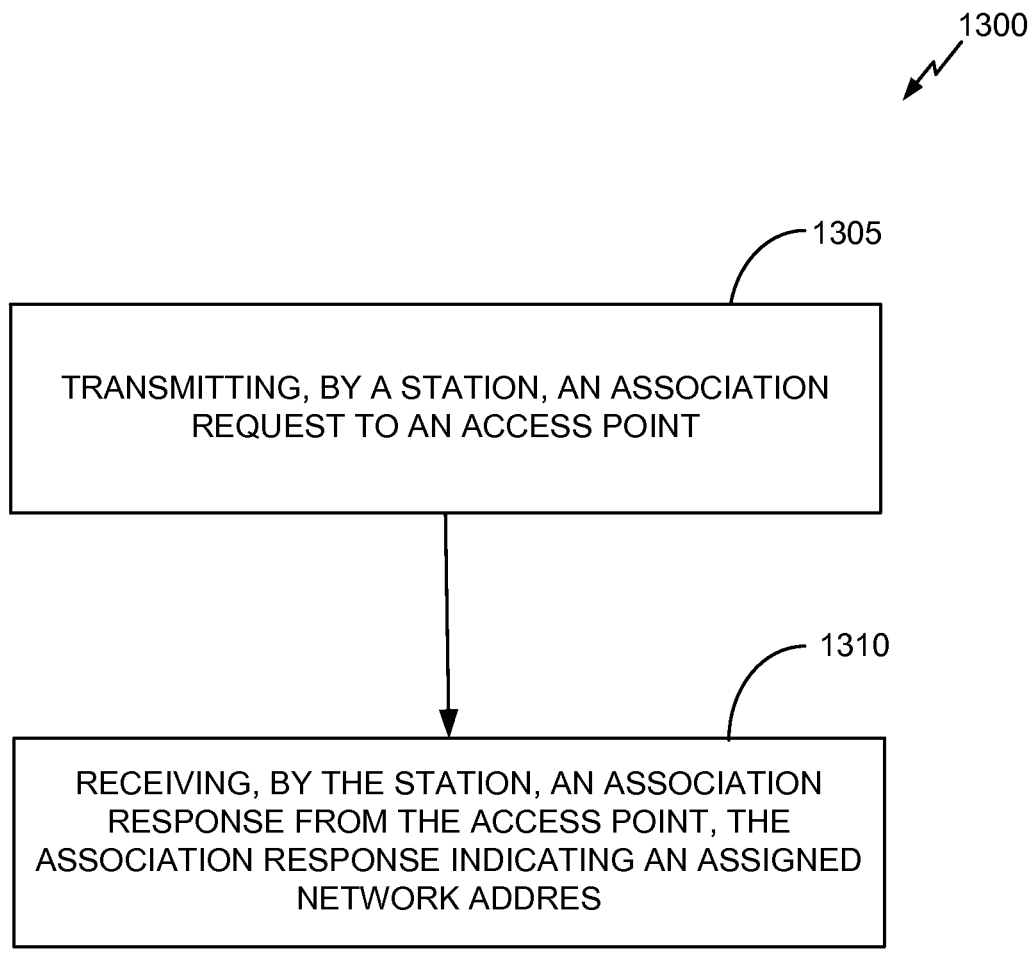
FIG. 13 shows a process flow diagram for a method of reducing latency in establishing communication in a wireless communication system.

FIG. 13 shows a process flow diagram for a method of reducing latency associated with establishing communication using a wireless communication system. The process shown may be performed in whole or in part by the devices described herein, such as that shown in FIG. 2 above or FIG. 17 below. In some implementations, the process may be implemented in a STA, e.g. STA 106. In some aspects, by receiving an assigned IP address as part of an association response, a station performing process 1300 may not need to perform separate signaling to obtain a network address. This may enable the STA to initiate communication over a wireless network with less latency when compared to existing methods.

The process 1300 begins at block 1305, where a station transmits an association request to an access point. In block 1310, an association response message is received by the station from the access point, the association response indicating an assigned network address. In some aspects, the assigned network address is an IP address. The signals transmitted and/or received in process 1300 may be implemented in a STA 106 or AP 104, similar to those shown in the call flows of FIG. 5B.

Figure 14:
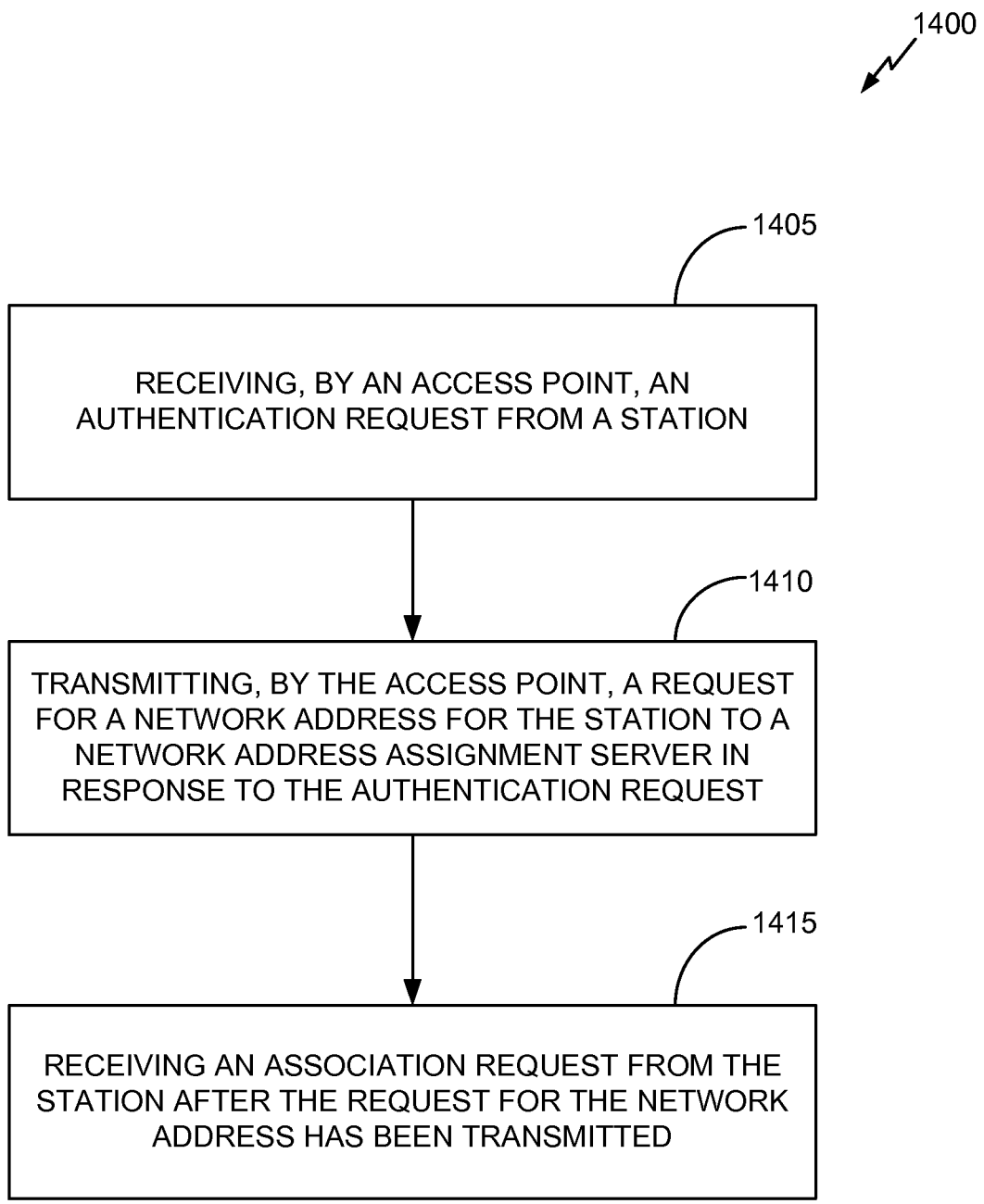
FIG. 14 shows a process flow diagram for a method of reducing latency in establishing communication in a wireless communication system.

FIG. 14 shows a process flow diagram for a method of reducing latency associated with establishing communication using a wireless communication system. The process shown may be performed in whole or in part by the devices described herein, such as that shown in FIG. 2 above or FIG. 17 below. In some implementations, the process may be implemented in an AP, e.g. AP 104. In some aspects, by transmitting a request for a network address for a station before receiving an association request from the station, the network address may be provided to the station earlier than was possible in existing methods. This may enable the STA 106 to initiate communication over a wireless network with less latency when compared to existing methods.

The process 1400 begins at block 1405, where an access point receives an authentication request from a station. In block 1410, a request for a network address for the station is transmitted to a network address assignment server. In some aspects, the request is transmitted in response to reception of the authentication request of block 1405. In block 1415, an association request is received from the station. The association request is received after the request for the network address has been transmitted.

Some aspects of process 1400 further include receiving a response from the network address assignment server indicating an assigned network address for the station. The process 1400 may then further include transmitting an association response to the station indicating the assigned network address. In some aspects of process 1400, the network address assignment server is a dynamic host configuration protocol (DHCP) server. In some aspects, the network address is an IP address. The signals transmitted and/or received in process 1400 may be implemented in a STA 106 or AP 104, similar to those shown in the call flows of FIG. 5B.

Figure 15:
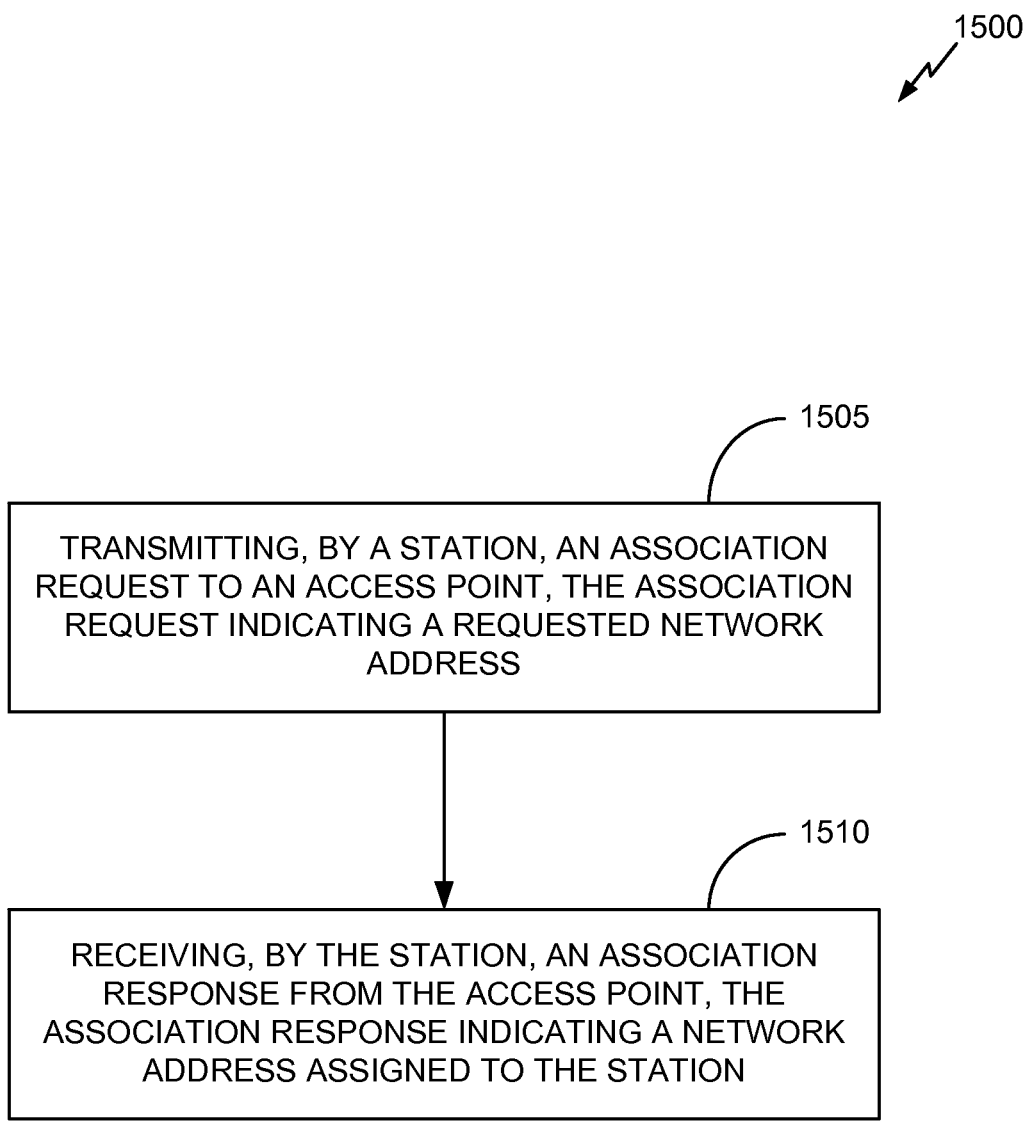
FIG. 15 shows a process flow diagram for a method of reducing latency in establishing communication in a wireless communication system.

FIG. 15 shows a process flow diagram for a method of reducing latency associated with establishing communication using a wireless communication system. The process shown may be performed in whole or in part by the devices described herein, such as that shown in FIG. 2 above or FIG. 17 below. In some implementations, the process may be implemented in a STA, e.g., STA 106. In some aspects, by transmitting a request for a network address for a station before receiving an association request from the station, the network address may be provided to the station earlier than was possible in existing methods. This may enable the STA 106 to initiate communication over a wireless network with less latency when compared to existing methods.

The process 1500 begins at block 1505, where an association request is transmitted by a station to an access point. The association request indicates a requested network address. In some aspects, the requested network address is an IP address. In some aspects, the station may have been previously assigned the requested network address. The station may have established one or more connections or sessions while utilizing the network address. If the station may be reassigned the same network address as it used previously, these established connections or sessions may be maintained. If a new network address is assigned to the station, any connections or sessions established based on the previous or requested network address may be terminated.

In block 1510, an association response is received by the station from the access point, the association response indicating a network address assigned to the station. In some aspects, the assigned network address is the requested network address. In some other aspects, the assigned network address may be a network address that is different than the requested network address. In some aspects, the assigned network address is an IP address. The signals transmitted and/or received in process 1500 may be implemented in a STA 106 or AP 104, similar to those shown in the call flows of FIG. 6.

Figure 16:
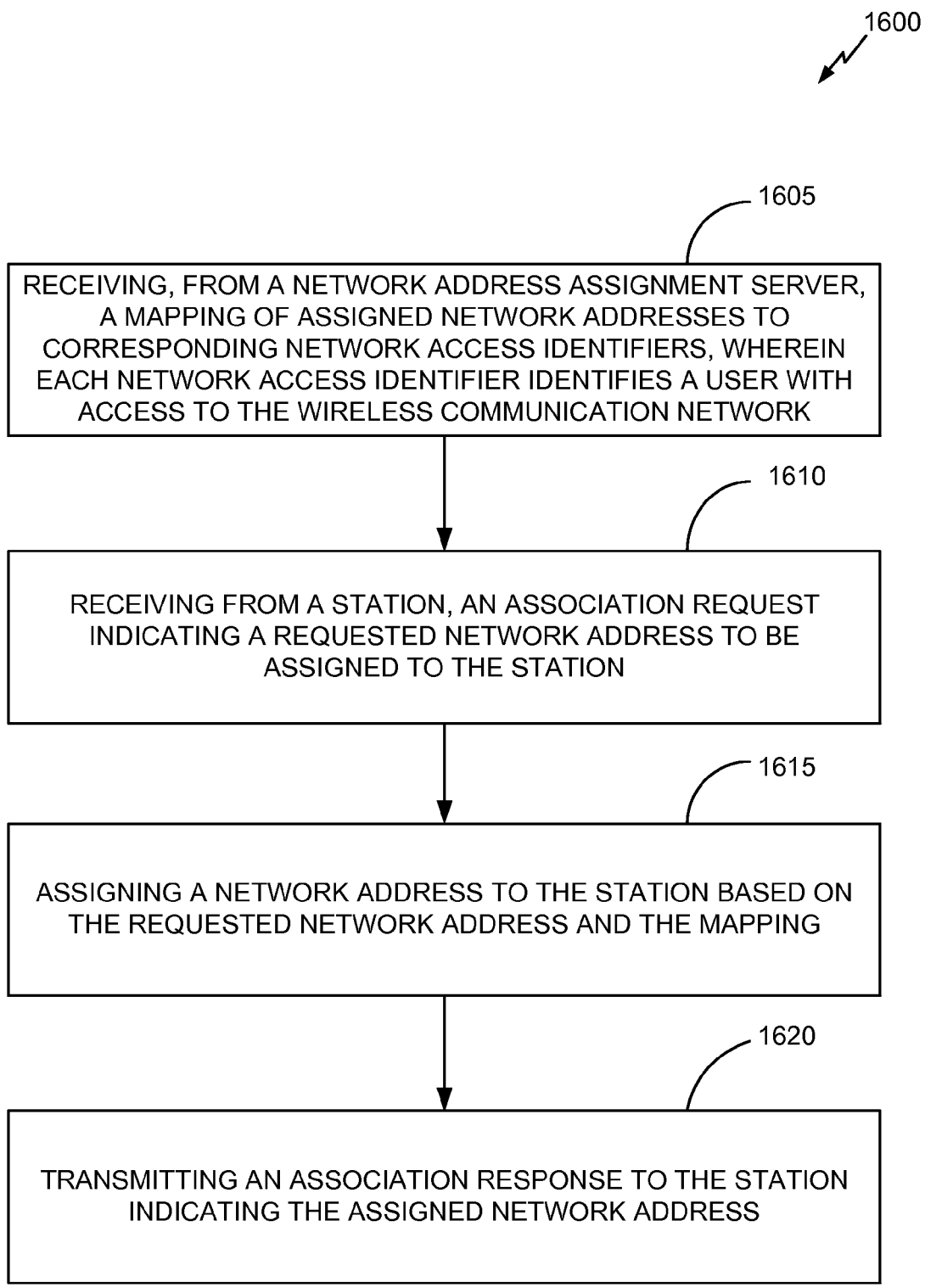
FIG. 16 shows a process flow diagram for a method of reducing latency in establishing communication in a wireless communication system.

FIG. 16 shows a process flow diagram for a method of reducing latency associated with establishing communication using a wireless communication system. The process shown may be performed in whole or in part by the devices described herein, such as that shown in FIG. 2 above or FIG. 17 below. In some implementations, the process may be implemented in an AP, e.g. AP 104. In some aspects, by receiving a mapping of assigned network addresses to corresponding network access identifiers, an AP 104 may more efficiently determine whether a STA 106 may be assigned a requested network address. This may enable the STA 106 to initiate communication over a wireless network with less latency when compared to existing methods.

The process 1600 begins at block 1605, where a mapping of assigned network addresses to corresponding network access identifiers is received from an address assignment server. Each network address identifier identifies a user with access to a wireless communication system. In some other aspects of process 1600, the mapping includes one or more mappings of network addresses to corresponding subscription identifiers, or corresponding identifiers used for authentication of the STA 106 on the wireless network. In some aspects, the mapping is received from a network node that is not a network address assignment server, but has access to the mapping information. For example, in one aspect, the message may be received from a gateway. In another aspect, the message may be received from an AP 104 within a vicinity of the STA 106.

In block 1610, an association request is received from a station indicating a requested network address to be assigned to the station. In block 1615, a network address is assigned to the station based on the requested network address and the mapping. For example, in some aspects, if the mapping indicates that the requested network address is currently assigned to the station, the requested network address is assigned to the station by the access point. If the mapping does not indicate the requested network address is assigned to the station, or the requested network address is assigned to a different station, then a second network address may be assigned to the station, where the second network address is different than the requested network address. In some aspects, the requested and/or assigned network addresses are IP addresses. In block 1620, an association response is transmitted to the station indicating the assigned network address. The signals transmitted and/or received in process 1600 may be implemented in a STA 106 or AP 104, similar to those shown in the call flows of FIG. 6.

Figure 17:
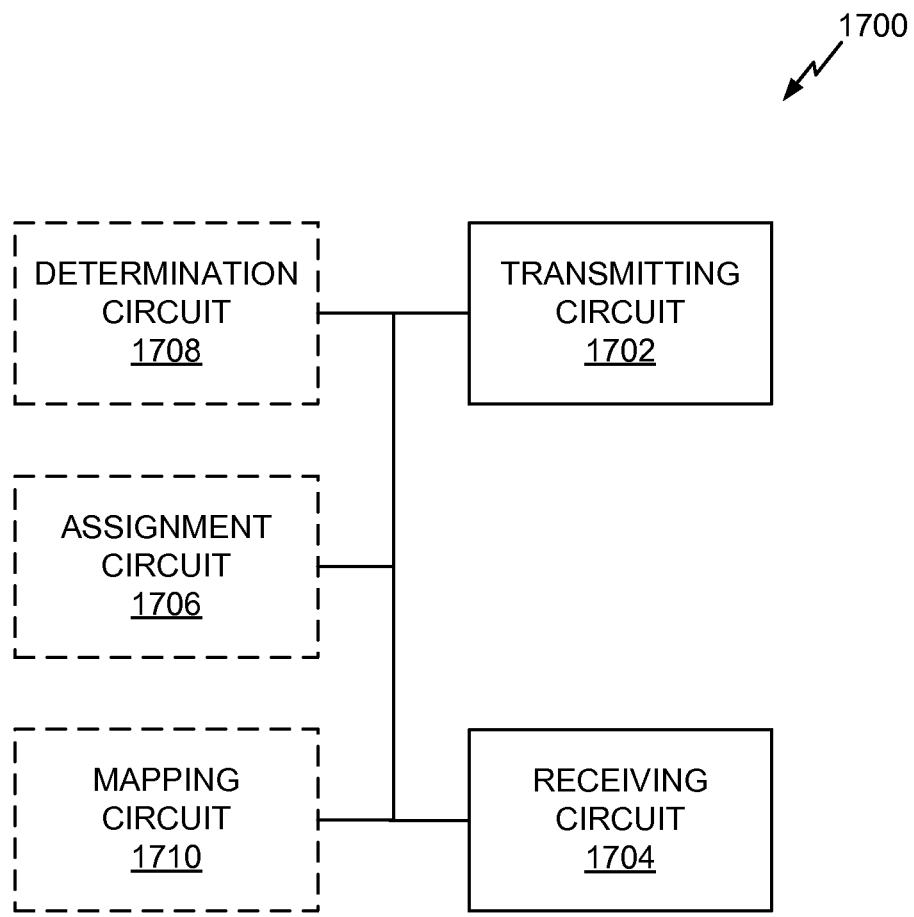
FIG. 17 shows a functional block diagram for a wireless communication apparatus of the present disclosure.

Referring now to FIG. 17, a functional block diagram of a wireless communication apparatus 1700 of the present disclosure is shown. Wireless communication apparatus may be representative of a STA 106 or an AP 104 in certain embodiments. Those skilled in the art will appreciate that a wireless communication apparatus may have more components than the simplified wireless communication apparatus 1700 shown in FIG. 17. The wireless communication apparatus 1700 shown includes various components useful for describing some prominent features of implementations within the scope of this disclosure and the claims. The wireless communication apparatus 1700 may include a transmitting circuit 1702, a receiving circuit 1704, an assignment circuit 1706, a determination circuit 1708, and a mapping circuit 1710, among other possible features. In an embodiment of AP 104, all five components shown (transmitting circuit 1702, receiving circuit 1704, assignment circuit 1706, determination circuit 1708, and mapping circuit 1710) may be implemented for use in one or more of the processes disclosed herein. Conversely, a STA 106 may not require the use of assignment circuit 1706, determination circuit 1708, and mapping circuit 1710. As such, assignment circuit 1706, determination circuit 1708, and mapping circuit 1710 are shown in dashed lines indicating their use predominantly with a device 1700 implemented as an AP 104. It should be appreciated by those skilled in the art, however that in certain embodiments, the assignment circuit 1706, determination circuit 1708, and mapping circuit 1710 may be required for use in an STA 106.

In some implementations, the transmitting circuit 1702, as implemented in a STA 106, may be configured to transmit an association request to an AP 104 as discussed with respect to FIG. 7 and FIG. 9. The transmitting circuit may be further configured to transmit a message utilizing a network address determined by the determination circuit 1708, discussed below.

In some implementations, the transmitting circuit 1702, as implemented in an AP 104, may be configured to transmit an association response to a STA 106 as noted with respect to FIG. 8. The association response may indicate an assigned interface identifier.

In some implementations, the transmitting circuit 1702 may be configured to transmit an association response to a STA 106, indicating a network address of a DNS server as discussed with respect to FIG. 10. The transmitting circuit 1702 may further be configured to transmit a message to a STA 106 based on a MAC address of the STA 106 received from an AP 104, as discussed with respect to FIG. 11.

In some implementations, the transmitting circuit 1702 may be configured to map the network address of each associated station to a corresponding MAC address, and transmit the mapping to another, different STA 106, as discussed with respect to FIG. 12.

In some implementations, the transmitting circuit 1702 may be configured to transmit a request for a network address for a station to a network address assignment server as noted in the discussion of FIG. 14.

In some implementations, the transmitting circuit 1702 of a station may be configured to transmit an association request to an AP 104 requesting a network address, as noted in the discussion of FIG. 15.

In some implementations, the transmitting circuit 1702 of an AP 104 may be configured to transmit an association response to a STA 106 indicating an assigned network address.

The transmitting circuit 1702 may include one or more of a transmitter, an antenna, a data network interface, and a memory. For example, the transmitting circuit 1702 may include the transmitter 210 of FIG. 2. In some implementations, the means for transmitting may include the transmitting circuit 1702. In an embodiment, the transmitting circuit 1702 may be configured to perform one or more of the "transmitting" functions described above with respect to blocks in the foregoing figures (e.g., block 705, 720, 815, 905, 1010, 1110, 1210, 1305, 1410, 1505, 1620).

In some implementations, the receiving circuit 1704 may be configured to receive an association response from an AP 104 as referred to in FIG. 7. The association response may indicate a network address of a DNS server as discussed with respect to FIG. 9. The association response may indicate an interface identifier assigned to the STA 106 by the AP 104. The association response may additionally or alternatively indicate an assigned network address as noted in the discussion of FIG. 13.

In some implementations, the receiving circuit 1704 of an AP 104 may be configured to receive an association request from a STA 106 as discussed with respect to FIG. 8 and FIG. 10.

In some implementations, the receiving circuit 1704 may be configured to receive a mapping of a station's network address to MAC address from an AP 104 as discussed with respect to FIG. 11.

In some implementations, the receiving circuit 1704 may be configured to receive an authentication request from a STA 106 as noted in the discussion of FIG. 14. The receiving circuit 1704 may be further configured to receive an association request from the STA 106 after a request for a network address for the STA 106 has been transmitted. The association response may indicate a network address assigned by the AP 104.

In some implementations, the receiving circuit 1554 may be configured to receive an association response from an AP 104 indicating a network address assigned to a STA 106, as noted in the discussion of FIG. 15.

In some implementations, the receiving circuit 1704 may be configured to receive an association request from a STA 106 indicating a requested network address to be assigned to the STA 106 as noted in the discussion of FIG. 16. In some implementations the receiving circuit 1704 may be further configured to receive a mapping of assigned network addresses to corresponding network access identifiers from a network address assignment server.

The receiving circuit 1704 may include one or more of a receiver, an antenna, a signal processor, and a memory similar to previous embodiments disclosed herein and those described with respect to FIG. 2. For example, the receiving circuit 1704 may include the receiver 212 of FIG. 2. In some implementations, the means for receiving may include the receiving circuit 1704. In an embodiment, the receiving circuit 1704 may be configured to perform one or more of the "receiving" functions described above with respect to blocks in the foregoing figures (e.g., blocks 710, 805, 910, 1005, 1105, 1310, 1405, 1415, 1510. 1605 and/or 1610).

In some implementations, the assignment circuit 1706 may be configured to assign an interface identifier to a STA 106. The assignment circuit 1706 may include one or more of a receiver, an antenna, a signal processor, and a memory. For example, the assignment circuit 1706 may include the receiver 212 of FIG. 2. In some implementations, the means for receiving may include the assignment circuit 1706. In an embodiment, the assignment circuit 1706 may be configured to perform one or more of the "assigning" functions described above with respect to foregoing figures (e.g., block 810, 1615).

In some implementations, the determination circuit 1708 may be configured to determine a network address based on an interface identifier as referred to in FIG. 7. The determination circuit 1708 may include one or more of a programmable chip, a processor, a memory, and a network interface. For example, the determination circuit 1708 may include one or more processor unit(s) 204. In some implementations, a means for determining a network address may include the determination circuit 1708.

In some implementations, the mapping circuit 1710 may be configured to determine a mapping of a station's network address to MAC address as described with respect to FIG. 12. The mapping circuit 1710 may include one or more of a receiver, an antenna, a signal processor, and a memory. For example, the mapping circuit 1710 may include the receiver 212 of FIG. 2. In some implementations, the means for determining a mapping may include the mapping circuit 1710. In an embodiment, the mapping circuit 1710 may be configured to perform one or more of the "mapping" functions described above with respect to blocks in the foregoing figures (e.g., block 1205).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The following are various embodiments of the present disclosure:

In one innovative aspect, a system and method for reducing latency in establishing wireless communication is disclosed. This aspect includes transmitting, by a station, an association request to an access point, receiving an association response from the access point, the association response indicating an interface identifier assigned to the station by the access point, determining a network address based on the interface identifier; and transmitting a message on the wireless network, the message utilizing the determined network address. In some embodiments, the association request indicates a number of interface identifiers requested by the station. This aspect also includes a computer readable medium configured to implement the method.

Another aspect disclosed is a system and method of reducing latency in establishing wireless communication. The method includes receiving by an access point, an association request from a station, assigning an interface identifier to the station, and transmitting an association response indicating the assigned interface identifier. In some aspects, the association request indicates a number of interface identifiers requested by the station.

Another aspect disclosed is a system and method of reducing latency in establishing wireless communication. The method includes transmitting, by a station, an association request to an access point; and receiving, by a station, an association response from the access point, the association response indicating a network address of a DNS server. In some aspects, the association response further indicates a MAC address of the DNS server.

Another aspect disclosed is a system and method of reducing latency in establishing wireless communication. The method includes receiving, by an access point, an association request from a station, and transmitting, by the access point, an association response to the station, the association response indicating a network address of a DNS server. In some aspects, the association response further indicates a MAC address of the DNS server.

Another aspect disclosed is a system and method of reducing latency in wireless communication. The method includes receiving, by a station, a mapping of a second station's network address to the second station's MAC address from an access point; and transmitting a message to the second station based on the MAC address. In some aspects, the mapping is included in an address resolution protocol message. In some aspects, the network address is an IPv4 address. In some aspects, the mapping is included in a NDP message. In some aspects, the network address is an IPv6 address.

Another aspect disclosed is a system and method of reducing latency in wireless communication. The method includes determining, by an access point, a mapping of a station's network address to the station's MAC address, transmitting, by the access point, the mapping to at least a second station. In some aspects, the method further includes assigning the network address to the station, wherein the determining is in response to the assigning. In some aspects, the mapping is transmitted in an address resolution protocol message. In some aspects, the network address is an IPv4 address. In some aspects, the mapping is transmitted in a NDP message. In some aspects, the network address is an IPv6 address.

Another aspect disclosed is a method of reducing latency in wireless communication. The method includes transmitting, by a station, an association request to an access point, and receiving, by the station, an association response from the access point, the association response indicating an assigned network address. In some aspects, the association request indicates a type of network address requested by the station.

Another aspect disclosed is a method of reducing latency in wireless communication. The method includes receiving, by an access point, an authentication request frame from a station, transmitting a request for a network address for the station to a network address assignment server in response to the authentication request frame, and receiving an association request from the station after the request for the network address has been transmitted. In some aspects, the method also includes receiving a response to the request for a network address, the response indicating a network address assigned to the station, and transmitting an association response to the station, the association response indicating the assigned network address.

Another aspect disclosed is a system and method of reducing latency in wireless communication. The method includes transmitting, by a station, an association request to an access point, the association request indicating a requested network address, and receiving, by the station, an association response from the access point, the association response indicating a network address assigned to the station. In some aspects, the method also includes transmitting a message using the requested network address prior to the transmission of the association request.

Another aspect disclosed is a system and method of reducing latency on a wireless communication network. The method includes receiving, from a network address assignment server, a mapping of assigned network addresses to corresponding network access identifiers, wherein each network access identifier identifies a user with access to the wireless communication network, receiving, from a station, an association request indicating a requested network address to be assigned to the station, assigning a network address to the station based on the requested network address and the mapping, and transmitting an association response to the station indicating the assigned network address. In some aspects, the method also includes requesting that an IP address be assigned to the station by the network address assignment server if the requested network address is not mapped to a network access identifier of the station by the mapping. In some aspects, the assigned network address is the requested network address if the mapping maps the requested network address to a network access identifier of the station. In some aspects, the network access identifier of the station is indicated by an authentication request frame received from the station.

What is claimed is:

1. A method of reducing latency in wireless communication, comprising:
   transmitting, by a first station, a request to an access point for the access point to allocate resources for and synchronize with the first station, the request comprising a requested network address; and
   receiving, by the first station, a response from the access point, the response indicating at least a portion of an assigned network address having been assigned by the access point, and at least one network address of at least one domain name system server, the assigned network address comprising the requested network address and the at least one network address of the at least one domain name system server being different than the assigned network address.

2. The method of claim 1, the at least a portion of an assigned network address comprising an interface identifier.

3. The method of claim 2 further comprising, determining an internet protocol version-6 network address of the first station based on the interface identifier.

4. The method of claim 1 further comprising receiving by the first station, a mapping of an internet protocol address of a second station to a corresponding medium access control address of the second station.

5. The method of claim 1, the at least a portion of an assigned network address comprising an internet protocol version-4 address.

6. The method of claim 1, the response further comprising an internet protocol address of the at least one domain name system server.

7. The method of claim 1, the response further comprising at least one medium access control address of at least one gateway that the station can use to communicate with the domain name system server.

8. A method of reducing latency in wireless communication, comprising:
receiving, at an access point, an authentication request frame from a first station;
transmitting, in response to the authentication request frame, a request for a network address assignment to a network address assignment server for at least the first station, or a request for a network address of a domain name system server;
receiving, at least a portion of an assigned network address or the network address of the domain name system server;
receiving, after transmitting the request for network address assignment, a request from the first station for the access point to allocate resources for and synchronize with the first station, the request comprising a network address requested by the first station; and
transmitting a response to the first station, the response comprising the at least a portion of an assigned network address, and the network address of the domain name system server, the assigned network address comprising the network address requested by the first station and the network address of the domain name system server being different than the assigned network address.

9. The method of claim 8, further comprising, assigning at least a portion of the network address to the first station in response to the request.

10. The method of claim 8, the at least a portion of an assigned network address comprising an internet protocol version-6 interface identifier.

11. The method of claim 8, the response further comprising a mapping of a network access identifier of a second station, to a corresponding network address assigned to the second station, wherein the network access identifier identifies the second station as having access to the wireless communication network.

12. The method of claim 8, the at least a portion of an assigned network address comprising an internet protocol version-4 address.

13. The method of claim 8, the response further comprising at least one medium access control address of a gateway that the first station can use to communicate with the domain name system server.

14. An apparatus for reducing latency in wireless communication, comprising:

a transmitter, configured to transmit, by a first station, a request to an access point for the access point to allocate resources for and synchronize with the first station, the request comprising a requested network address; and
a receiver, configured to receive, by the first station, a response from the access point, the response indicating at least a portion of a network address assigned to the first station and a network address of a domain name system server, the assigned network address comprising the requested network address and the network address of the domain name system server being different than the assigned network address.

15. The apparatus of claim 14, the at least a portion of a network address assigned to the first station, comprising an internet protocol version-6 interface identifier.

16. The apparatus of claim 15, further comprising determining a network address based on the interface identifier.

17. The apparatus of claim 14, further comprising receiving a mapping of an internet protocol address of a second station to a corresponding medium access control address of the second station.

18. The apparatus of claim 14, the at least a portion of a network address assigned to the first station, comprising an internet protocol version-4 address.

19. The apparatus of claim 14, the response further comprising a network address of the domain name system server.

20. The apparatus of claim 14, the response further comprising a medium access control address of a gateway that the first station can use to communicate with the domain name system server.

21. An apparatus for reducing latency in wireless communication, comprising:
a receiver, configured to receive, at an access point, an authentication request frame from a first station;
a transmitter configured to transmit, in response to the authentication request frame, a request to a network access assignment server for a network address assignment for at least the first station, or a request for a network address of a domain name system server;
the receiver, further configured to receive at least a portion of a network address from the network access assignment server, or the network address of the domain name system server;
the receiver, further configured to receive, after transmitting the request for network address assignment, a request from the first station for the access point to allocate resources for and synchronize with the first station, the request comprising a network address requested by the first station; and
the transmitter, further configured to transmit a response to the first station, the response comprising the at least a portion of an assigned network address, and the network address of the domain name system server, the assigned network address comprising the network address requested by the first station and the network address of the domain name system server being different than the assigned network address.

22. The apparatus of claim 21, further comprising assigning, in response to the request, at least a portion of the network address to the first station.

23. The apparatus of claim 21, the at least a portion of an assigned network address comprising an internet protocol version-6 interface identifier.

24. The apparatus of claim 21, the response further comprising a mapping of a network address of a second station to a corresponding network access identifier for the second station, wherein the network access identifier identifies the second station as having access to the wireless communication network.

25. The apparatus of claim 21, the at least a portion of an assigned network address comprising an internet protocol version-4 address.

26. The apparatus of claim 21, the response further comprising a network address of the domain name system server.

27. The apparatus of claim 21, the response further comprising a medium access control address of a gateway that the first station can use to communicate with the domain name system server.

28. An apparatus for reducing latency in wireless communication, comprising:
  means for transmitting a request to an access point for the access point to allocate resources for and synchronize with the first station, the request comprising a requested network address; and
  means for receiving a response from the access point, the response indicating at least a portion of a network address assigned by the access point, and a network address of a domain name system server, the assigned network address comprising the requested network address and the network address of the domain name system server being different than the assigned network address.

29. An apparatus for reducing latency in wireless communication, comprising:
  means for receiving an authentication request frame from a first station;
  means for transmitting, in response to the authentication request frame, a request for a network address assignment to a network address assignment server for at least the first station, or a request for a network address of a domain name system server;
  means for receiving, at least a portion of the network address from the network address assignment server or the network address of the domain name system server;
  means for receiving, after transmitting the request for network address assignment, a request from the first station for the access point to allocate resources for and synchronize with the first station, the request comprising a network address requested by the first station; and
  means for transmitting a response to the first station, the response comprising the at least a portion of a network address assigned by the access point, and the network address of the domain name system server, the assigned network address comprising the network address requested by the first station and the network address of the domain name system server being different than the assigned network address.

30. A non-transitory computer readable medium storing instructions that when executed cause a processor to perform a method comprising:
  transmitting, by a station, a request to an access point for the access point to allocate resources for and synchronize with the first station, the request comprising a requested network address; and
  receiving, by the station, a response from the access point, the response indicating at least a portion of an assigned network address and a network address of a domain name system server, the assigned network address comprising the requested network address and the network address of the domain name system server being different than the assigned network address.

31. A non-transitory computer readable medium storing instructions that when executed cause a processor to perform a method comprising:
  receiving, at an access point, an authentication request frame from a first station;
  transmitting, in response to the authentication request frame, a request for a network address assignment to a network address assignment server for at least the first station, or a request for a network address of a domain name system server;
  receiving, at least a portion of the network address from the network address assignment server or the network address of the domain name system server;
  receiving, after transmitting the request for network address assignment, a request from the first station for the access point to allocate resources for and synchronize with the first station, the request comprising a network address requested by the first station; and
  transmitting a response to the first station, the response comprising the at least a portion of the network address, and the network address of the domain name system server, the assigned network address comprising the network address requested by the first station and the network address of the domain name system server being different than the assigned network address.

32. The method of claim 1, further comprising receiving a mapping from the access point, by the first station, after receiving the response from the access point, the mapping comprising a network address of a second station mapped to a corresponding medium access control address of the second station.

33. The method of claim 32, wherein the second station comprises a network gateway.

34. The method of claim 8, further comprising transmitting a mapping to the first station, by the access point, after transmitting the response to the first station, the mapping comprising a network address of a second station mapped to a corresponding medium access control address of the second station.

35. The method of claim 34, wherein the second station comprises a network gateway.

36. The apparatus of claim 14, wherein the receiver is further configured to receive a mapping from the access point, after receiving the response from the access point, the mapping comprising a network address of a second station mapped to a corresponding medium access control address of the second station.

37. The apparatus of claim 36, wherein the second station comprises a network gateway.

38. The apparatus of claim 21, wherein the transmitter is further configured to transmit a mapping to the first station, after transmitting the response to the first station, the mapping comprising a network address of a second station mapped to a corresponding medium access control address of the second station.

39. The apparatus of claim 38, wherein the second station comprises a network gateway.

* * * * *